US012701047B2

(12) United States Patent
Mishra et al.

(10) Patent No.: US 12,701,047 B2
(45) Date of Patent: Aug. 4, 2026

(54) NETWORK MANAGEMENT AND CONTROL WITH CONTAINERIZED ROUTER APPLICATIONS AND MULTIPLE COMMUNICATION NETWORK MODALITIES AT THE EDGE

(71) Applicant: Armada Systems Inc., San Francisco, CA (US)

(72) Inventors: Pragyana Mishra, Seattle, WA (US); Anish Swaminathan, Greebrae, CA (US)

(73) Assignee: Armada Systems Inc., San Francisco, CA (US)

( * ) Notice: Subject to any disclaimer, the term of this patent is extended or adjusted under 35 U.S.C. 154(b) by 111 days.

(21) Appl. No.: 18/934,645

(22) Filed: Nov. 1, 2024

(65) Prior Publication Data

US 2025/0141740 A1 May 1, 2025

Related U.S. Application Data

(60) Provisional application No. 63/595,228, filed on Nov. 1, 2023.

(51) Int. Cl.
*H04L 41/0816* (2022.01)
*H04B 7/185* (2006.01)

(52) U.S. Cl.
CPC ..... *H04L 41/0816* (2013.01); *H04B 7/18584* (2013.01)

(58) Field of Classification Search
CPC ..... H04L 41/0816; H04L 41/04; H04L 43/08; H04L 43/20; H04B 7/18584
See application file for complete search history.

(56) References Cited

U.S. PATENT DOCUMENTS

| 12,470,975 | B2 * | 11/2025 | Wheelock | H04L 45/306 |
| 12,476,901 | B2 * | 11/2025 | Mahadevan | H04L 45/22 |
| 2021/0014710 | A1 * | 1/2021 | Raju | H04W 4/38 |
| 2022/0255966 | A1 * | 8/2022 | Sienicki | H04L 63/123 |
| 2022/0329522 | A1 * | 10/2022 | Maciocco | H04L 41/16 |

(Continued)

FOREIGN PATENT DOCUMENTS

| JP | 2015502718 A | * | 1/2015 | H04L 41/0659 |
| WO | WO-2023034500 A1 | * | 3/2023 | G01S 5/0278 |

*Primary Examiner* — Richard G Keehn
(74) *Attorney, Agent, or Firm* — Polsinelli PC

(57) ABSTRACT

Systems and techniques are provided for multi-WAN routing and management at the edge. A multi-WAN network device can configure first and second backhaul connections between a local edge network and a remote WAN, the first and second backhaul connections implemented using first and second communication modalities different from one another and included in a plurality of communication modalities of the multi-WAN network device. A first containerized application on the multi-WAN network device can obtain telemetry or monitoring information generated by a satellite internet constellation terminal in the local edge network, and can transmit the information to a cloud management entity using one or more of the first or second backhaul connections of the multi-WAN network device. The multi-WAN network device can implement a network configuration adjustment for one or more of the first or second backhaul connection based at least in part on the telemetry information or monitoring information.

20 Claims, 10 Drawing Sheets

(56)                    References Cited

U.S. PATENT DOCUMENTS

2023/0006889 A1*   1/2023   Thyagaturu ......... H04L 41/0806
2023/0319639 A1*  10/2023   Yu ......................... H04L 45/586
                                                                370/235
2023/0362056 A1*  11/2023   Lucas ................. H04L 41/0813
2024/0023028 A1*   1/2024   Nikopour ............... G06N 3/045
2024/0129194 A1*   4/2024   Mueck ............... H04L 41/0806
2024/0259879 A1*   8/2024   Ranganath ............... G06N 5/01
2024/0305533 A1*   9/2024   Bai ....................... H04W 24/02
2024/0312130 A1*   9/2024   Palermo .......... H04N 21/41407
2025/0374058 A1*  12/2025   Palermo ................... H04L 9/40

* cited by examiner

Figure 5:
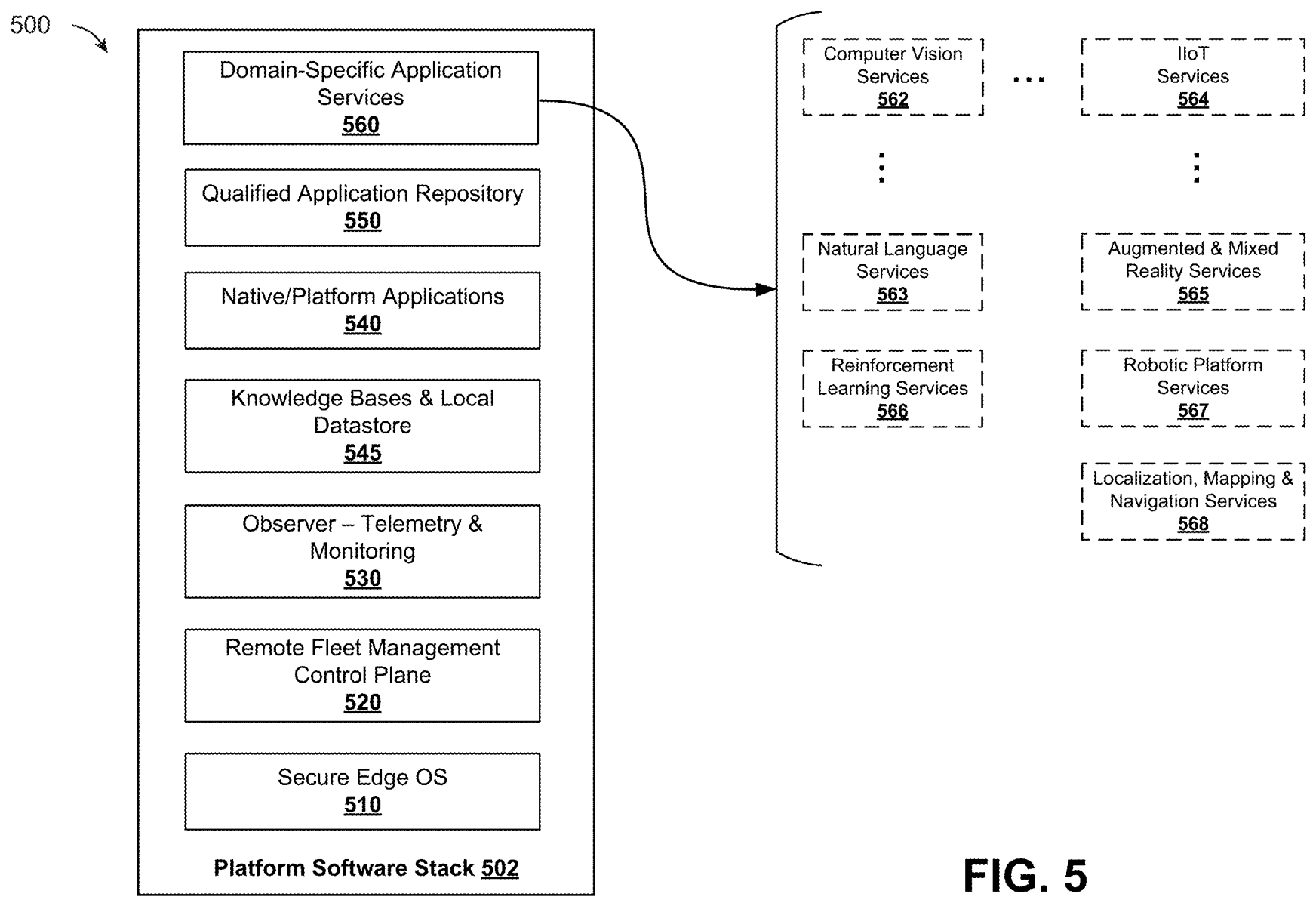

IIoT Services 564

Augmented & Mixed Reality Services 565

Robotic Platform Services 567

Localization, Mapping & Navigation Services 568

Computer Vision Services 562

Natural Language Services 563

Reinforcement Learning Services 566

Domain-Specific Application Services 560

Qualified Application Repository 550

Native/Platform Applications 540

Knowledge Bases & Local Datastore 545

Observer – Telemetry & Monitoring 530

Remote Fleet Management Control Plane 520

Secure Edge OS 510

Platform Software Stack 502

Global Management Platform 702

Global Management Console
620

Application Repository
650

Remote Fleet Management Control Plane 520

Organization & Onboarding
722

Provisioning Service
724

Device Lifecycle Mgmt
670

Fleet Datastore
747

Metrics Datastore
749

Metrics Visualization

704

704

704

Edge Compute Unit Host 705

User Device
795

Metrics Readout

Local Management Console
625

Metrics Datastore
742

Edge Observer 760

Application Deployer
757

Host-Level Telemetry
737

Critical Environment Monitoring
739

Fleet Mgmt Client 770

Fleet Management Daemon
673

Log Archival Agent
775

Edge Asset
710-1

Edge Asset
710-N

Log Stream

Edge OS
615

FIG. 7

NETWORK MANAGEMENT AND CONTROL WITH CONTAINERIZED ROUTER APPLICATIONS AND MULTIPLE COMMUNICATION NETWORK MODALITIES AT THE EDGE

CROSS-REFERENCE TO RELATED APPLICATIONS

This application claims the benefit of priority to U.S. Provisional Patent Application No. 63/595,228 filed Nov. 1, 2023 and entitled "NETWORK MANAGEMENT AND CONTROL WITH CONTAINERIZED ROUTER APPLICATIONS AND MULTIPLE COMMUNICATION NETWORK MODALITIES AT THE EDGE," the disclosure of which is herein incorporated by reference in its entirety and for all purposes.

TECHNICAL FIELD

The present disclosure pertains to edge computing, and more specifically pertains to systems and techniques for implementing network management and control for an edge datacenter unit, including systems and techniques for multiple Wide Area Network (multi-WAN) routing and network management at the edge.

BACKGROUND

Edge computing is a distributed computing paradigm that can be used to decentralize data processing and other computational operations by bringing compute capability and data storage closer to the edge (e.g., the location where the compute and/or data storage is needed, often at the "edge" of a network such as the internet). Edge computing systems are often provided in the same location where input data is generated and/or in the same location where an output result of the computational operations is needed. The use of edge computing systems can reduce latency and bandwidth usage, as data is ingested and processed locally at the edge and rather than being transmitted to a more centralized location for processing.

In many existing cloud computing architectures, data generated at endpoints (e.g., mobile devices, Internet of Things (IoT) sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence (AI) and machine learning (ML) workloads. For instance, centralized processing models and conventional cloud computing architectures can face constraints in the areas of latency, availability, bandwidth usage, data privacy, network security, and the capacity to process large volumes of data in a timely manner.

In the context of edge computing, the "edge" refers to the edge of the network, close to the endpoint devices and the sources of data. In an edge computing architecture, computation and data storage are distributed across a network of edge nodes that are near the endpoint devices and sources of data. The edge nodes can be configured to perform various tasks relating to data processing, storage, analysis, etc. Based on using the edge nodes to process data locally, the amount of data that is transferred from the edge to the cloud (or other centralized data center) can be significantly reduced. Accordingly, the use of edge computing has become increasingly popular for implementing a diverse range of AI and ML applications, as well as for serving other use cases that demand real-time processing, minimal latency, high availability, and high reliability.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for multiple Wide Area Network (multi-WAN) routing and network management at the edge. According to at least one illustrative example, a method of processing streaming data is provided. The method includes: configuring a first backhaul connection between a local edge network and a remote wide area network (WAN), the first backhaul connection implemented using a first communication modality of a plurality of communication modalities of a multiple-WAN (multi-WAN) network device included in the local edge network; configuring a second backhaul connection between the local edge network and the remote WAN, the second backhaul connection implemented using a second communication modality of the plurality of communication modalities of the multi-WAN network device, wherein the second communication modality is different from the first communication modality; obtaining, using a first containerized application running on the multi-WAN network device, one or more of telemetry information or monitoring information generated by a satellite internet constellation terminal included in the local edge network, wherein the telemetry information or monitoring information is obtained from the satellite internet constellation terminal over the local edge network; transmitting at least a portion of the telemetry information or monitoring information to a cloud management entity associated with the local edge network, wherein the at least a portion of the telemetry information or monitoring information is transmitted using one or more of the first backhaul connection or the second backhaul connection implemented by the multi-WAN network device; and implementing, by the multi-WAN network device, a network configuration adjustment for one or more of the first or second backhaul connection, the network configuration adjustment based at least in part on the telemetry information or monitoring information.

In another illustrative example, an apparatus is provided for processing streaming data. The apparatus includes at least one memory and at least one processor coupled to the at least one memory and configured to: configure a first backhaul connection between a local edge network and a remote wide area network (WAN), the first backhaul connection implemented using a first communication modality of a plurality of communication modalities of a multiple-WAN (multi-WAN) network device included in the local edge network; configure a second backhaul connection between the local edge network and the remote WAN, the second backhaul connection implemented using a second communication modality of the plurality of communication modalities of the multi-WAN network device, wherein the second communication modality is different from the first communication modality; obtain, using a first containerized application running on the multi-WAN network device, one or more of telemetry information or monitoring information generated by a satellite internet constellation terminal included in the local edge network, wherein the telemetry information or monitoring information is obtained from the satellite internet constellation terminal over the local edge network; transmit at least a portion of the telemetry information or monitoring information to a cloud management entity associated with the local edge network, wherein the at least a portion of the telemetry information or monitoring information is transmitted using one or more of the first backhaul connection or the second backhaul connection implemented by the multi-WAN network device; and implement, by the multi-WAN network device, a network configuration adjustment for one or more of the first or second backhaul connection, the network configuration adjustment based at least in part on the telemetry information or monitoring information.

In another illustrative example, a non-transitory computer-readable storage medium is provided and comprises instructions stored thereon which, when executed by at least one processor, causes the at least one processor to: configure a first backhaul connection between a local edge network and a remote wide area network (WAN), the first backhaul connection implemented using a first communication modality of a plurality of communication modalities of a multiple-WAN (multi-WAN) network device included in the local edge network; configure a second backhaul connection between the local edge network and the remote WAN, the second backhaul connection implemented using a second communication modality of the plurality of communication modalities of the multi-WAN network device, wherein the second communication modality is different from the first communication modality; obtain, using a first containerized application running on the multi-WAN network device, one or more of telemetry information or monitoring information generated by a satellite internet constellation terminal included in the local edge network, wherein the telemetry information or monitoring information is obtained from the satellite internet constellation terminal over the local edge network; transmit at least a portion of the telemetry information or monitoring information to a cloud management entity associated with the local edge network, wherein the at least a portion of the telemetry information or monitoring information is transmitted using one or more of the first backhaul connection or the second backhaul connection implemented by the multi-WAN network device; and implement, by the multi-WAN network device, a network configuration adjustment for one or more of the first or second backhaul connection, the network configuration adjustment based at least in part on the telemetry information or monitoring information.

In another illustrative example, an apparatus is provided for processing streaming data. The apparatus includes: means for configuring a first backhaul connection between a local edge network and a remote wide area network (WAN), the first backhaul connection implemented using a first communication modality of a plurality of communication modalities of a multiple-WAN (multi-WAN) network device included in the local edge network; means for configuring a second backhaul connection between the local edge network and the remote WAN, the second backhaul connection implemented using a second communication modality of the plurality of communication modalities of the multi-WAN network device, wherein the second communication modality is different from the first communication modality; means for obtaining, using a first containerized application running on the multi-WAN network device, one or more of telemetry information or monitoring information generated by a satellite internet constellation terminal included in the local edge network, wherein the telemetry information or monitoring information is obtained from the satellite internet constellation terminal over the local edge network; means for transmitting at least a portion of the telemetry information or monitoring information to a cloud management entity associated with the local edge network, wherein the at least a portion of the telemetry information or monitoring information is transmitted using one or more of the first backhaul connection or the second backhaul connection implemented by the multi-WAN network device; and means for implementing, by the multi-WAN network device, a network configuration adjustment for one or more of the first or second backhaul connection, the network configuration adjustment based at least in part on the telemetry information or monitoring information.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), robotic unit (e.g., uncrewed ground vehicle, uncrewed aerial vehicle, articulated arm, visual inspection system, cobot, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-colocated physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station. An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which:

FIG. 5 is a diagram illustrating an example software stack associated with implementing an edge computing system for ML and/or AI workloads, in accordance with some examples;

FIG. 7 is a diagram illustrating an example infrastructure and architecture for implementing an edge compute unit of an edge computing system for ML and/or AI workloads, in accordance with some examples;

DETAILED DESCRIPTION

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive. The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Further details regarding the systems and techniques described herein will be discussed below with respect to the figures.

OVERVIEW

Figure 1:
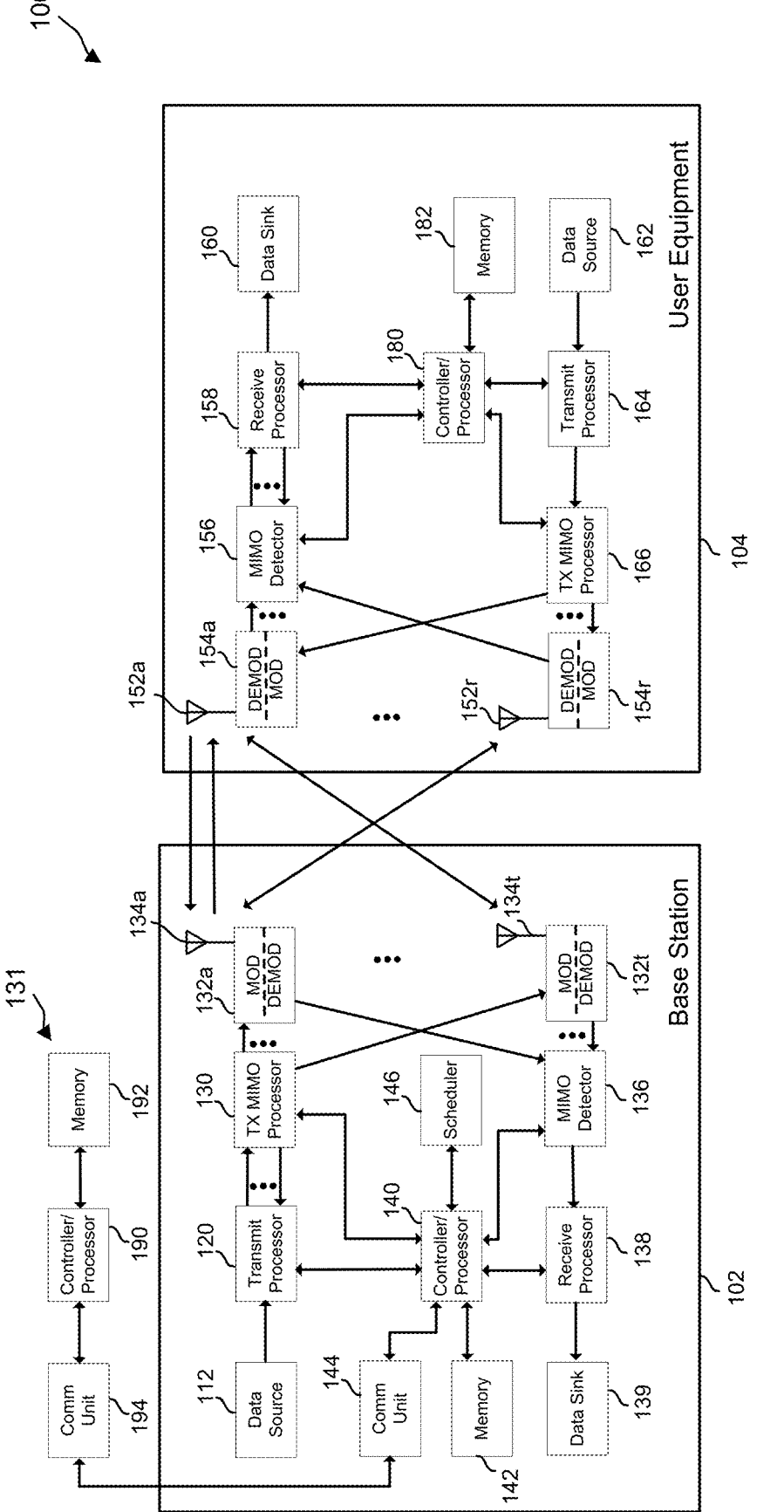
FIG. 1 depicts an example design of a base station and a user equipment (UE) for transmission and processing of signals exchanged between the UE and the base station, in accordance with some examples.

FIG. 1 shows a block diagram of a design of a base station 102 and a UE 104 that enable transmission and processing of signals exchanged between the UE and the base station, in accordance with some aspects of the present disclosure. Design 100 includes components of a base station 102 and a UE 104. In some examples, the architecture of base station 102 can be the same as or similar to an architecture used to implement a satellite constellation ground station (e.g., internet gateway for providing internet connectivity via a satellite constellation). In some examples, the architecture of base station 102 can be the same as or similar to an architecture used to implement a satellite of a satellite constellation and/or a network entity in communication with a satellite constellation (e.g., such as the satellite constellations and/or networks depicted in FIGS. 2A and 2B).

As illustrated in FIG. 1, base station 102 may be equipped with T antennas 134a through 134t, and UE 104 may be equipped with R antennas 152a through 152r, where in general T≥1 and R≥1. At base station 102, a transmit processor 120 may receive data from a data source 112 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 120 may also process system information (e.g., for semi-static resource partitioning information (SRPI) and/or the like) and control information (e.g., CQI requests, grants, upper layer signaling, and/or the like) and provide overhead symbols and control symbols. Transmit processor 120 may also generate reference symbols for reference signals (e.g., the cell-specific reference signal (CRS)) and synchronization signals (e.g., the primary synchronization signal (PSS) and secondary synchronization signal (SSS))). A transmit (TX) multiple-input multiple-output (MIMO) processor 130 may perform spatial processing (e.g., precoding) on the data symbols, the control symbols, the overhead symbols, and/or the reference symbols, if applicable, and may provide T output symbol streams to T modulators (MODs) 132a through 132t. The modulators 132a through 132t are shown as a combined modulator-demodulator (MOD-DEMOD). In some cases, the modulators and demodulators can be separate components. Each modulator of the modulators 132a to 132t may process a respective output symbol stream, e.g., for an orthogonal frequency-division multiplexing (OFDM) scheme and/or the like, to obtain an output sample stream. Each modulator of the modulators 132a to 132t may further process (e.g., convert to analog, amplify, filter, and upconvert) the output sample stream to obtain a downlink signal. T downlink signals may be transmitted from modulators 132a to 132t via T antennas 134a through 134t, respectively. According to certain aspects described in more detail below, the synchronization signals can be generated with location encoding to convey additional information.

At UE 104, antennas 152a through 152r may receive the downlink signals from base station 102 and/or other base stations and may provide received signals to demodulators (DEMODs) 154a through 154r, respectively. The demodulators 154a through 154r are shown as a combined modulator-demodulator (MOD-DEMOD). In some cases, the modulators and demodulators can be separate components. Each demodulator of the demodulators 154a through 154r may condition (e.g., filter, amplify, downconvert, and digitize) a received signal to obtain input samples. Each demodulator of the demodulators 154a through 154r may further process the input samples (e.g., for OFDM and/or the like) to obtain received symbols. A MIMO detector 156 may obtain received symbols from all R demodulators 154a through 154r, perform MIMO detection on the received symbols if applicable, and provide detected symbols. A receive processor 158 may process (e.g., demodulate and decode) the detected symbols, provide decoded data for UE 104 to a data sink 160, and provide decoded control information and system information to a controller/processor 180. A channel processor may determine reference signal received power (RSRP), received signal strength indicator (RSSI), reference signal received quality (RSRQ), channel quality indicator (CQI), and/or the like.

On the uplink, at UE 104, a transmit processor 164 may receive and process data from a data source 162 and control information (e.g., for reports comprising RSRP, RSSI, RSRQ, CQI, and/or the like) from controller/processor 180. Transmit processor 164 may also generate reference symbols for one or more reference signals (e.g., based at least in part on a beta value or a set of beta values associated with the one or more reference signals). The symbols from transmit processor 164 may be precoded by a TX-MIMO processor 166 if application, further processed by modulators 154a through 154r (e.g., for DFT-s-OFDM, CP-OFDM, and/or the like), and transmitted to base station 102. At base station 102, the uplink signals from UE 104 and other UEs may be received by antennas 134a through 134t, processed by demodulators 132a through 132t, detected by a MIMO detector 136 if applicable, and further processed by a receive processor 138 to obtain decoded data and control information sent by UE 104. Receive processor 138 may provide the decoded data to a data sink 139 and the decoded control information to controller (e.g., processor) 140. Base station 102 may include communication unit 144 and communicate to a network controller 131 via communication unit 144. Network controller 131 may include communication unit 194, controller/processor 190, and memory 192. In some aspects, one or more components of UE 104 may be included in a housing. Memories 142 and 182 may store data and program codes for the base station 102 and the UE 104, respectively. A scheduler 146 may schedule UEs for data transmission on the downlink, uplink, and/or sidelink.

Data Network Connectivity Using Satellite Constellations

As noted previously, low-orbit satellite constellation systems have been rapidly developed and deployed to provide wireless communications and data network connectivity. A fleet of discrete satellites (also referred to as "birds") can be arranged as a global satellite constellation that provides at least periodic or intermittent coverage to a large portion of the Earth's surface. In many cases, at least certain areas of the Earth's service may have continuous or near-continuous coverage from at least one bird of the satellite constellation. For instance, a global satellite constellation can be formed based on a stable (and therefore predictable) space geometric configuration, in which the fleet of birds maintain fixed space-time relationships with one another. A satellite constellation be used to provide data network connectivity to ground-based devices and/or other terrestrial receivers. For example, a satellite constellation can be integrated with or otherwise provide connectivity to one or more terrestrial (e.g., on-ground) data networks, such as the internet, a 4G/LTE network, and/or a 5G/NR network, among various others. In one illustrative example, a satellite internet constellation system can include a plurality of discrete satellites arranged in a low-earth orbit and used to provide data network connectivity to the internet.

To implement an internet satellite constellation, the discrete satellites can be used as space-based communication nodes that couple terrestrial devices to terrestrial internet gateways. The terrestrial internet gateways may also be referred to as ground stations, and are used to provide connectivity to the internet backbone. For instance, a given satellite can provide a first communication link to a terrestrial device and a second communication link to a ground station that is connected to an internet service provider (ISP). The terrestrial device can transmit data and/or data requests to the satellite over the first communication link, with the satellite subsequently forwarding the transmission to the ground station internet gateway (from which point onward the transmission from the device is handled as a normal internet transmission). The terrestrial device can receive data and/or requests using the reverse process, in which the satellite receives a transmission from the ground station internet gateway via the second communication link and then forwards the transmission to the terrestrial device using the first communication link.

Although an internet satellite constellation includes a fleet of discrete satellites, in some cases terrestrial devices connected with a satellite may communicate with a ground station/internet gateway that is also able to communicate with the same satellite. In other words, it is typically the case that the first and second communication links described above must be established with the same satellite of the satellite constellation. A user connecting to any particular satellite is therefore limited by the ground station/internet gateways that are visible to that particular satellite. For instance, a user connected to a satellite that is unable to establish a communication link with a ground station/internet gateway is therefore unable to connect to the internet—although the fleet of satellites is a global network in terms of spatial diversity and arrangement, the individual satellites function as standalone internet relay nodes unless an inter-satellite link capability is provided.

In some cases, inter-satellite links can allow point to point communications between the individual satellites included in a satellite constellation. For instance, data can travel at the speed of light from one satellite to another, resulting in a fully interconnected global mesh network that allows access to the internet as long as the terrestrial device can establish communication with at least one satellite of the satellite internet constellation. In one illustrative example, a satellite internet constellation can implement inter-satellite links as optical communication links. For example, optical space lasers can be used to implement optical intersatellite links (ISLs) between some (or all) of the individual birds of a satellite constellation. In this manner, the satellite internet constellation can be used to transmit data without the use of local ground stations, and may be seen to provide truly global coverage.

For instance, optical laser links between individual satellites in a satellite constellation can reduce long-distance latency by as much as 50%. Additionally, optical laser links (e.g., ISLs) can enable the more efficient sharing of capacity by utilizing the otherwise wasted satellite capacity over regions without ground station internet gateways. Moreover, optical laser links allow the satellite constellation to provide internet service (or other data network connectivity) to areas where ground stations are not present and/or are impossible to install.

To implement a satellite constellation, one or more satellites may be integrated with the terrestrial infrastructure of a wireless communication system. In general, satellites may refer to Low Earth Orbit (LEO) devices, Medium Earth Orbit (MEO) devices, Geostationary Earth Orbit (GEO) devices, and/or Highly Elliptical Orbit (HEO) devices. In some aspects, a satellite constellation can be included in or used to implement a non-terrestrial network (NTN). A non-terrestrial network (NTN) may refer to a network, or a segment of a network, that uses an airborne or spaceborne vehicle for transmission. For instance, spaceborne vehicles can refer to various ones of the satellites described above. An airborne vehicle may refer to High Altitude Platforms (HAPs) including Unmanned Aircraft Systems (UAS). An NTN may be configured to help to provide wireless communication in un-served or underserved areas to upgrade the performance of terrestrial networks. For example, a communication satellite (e.g., of a satellite constellation) may provide coverage to a larger geographic region than a terrestrial network base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 2A:
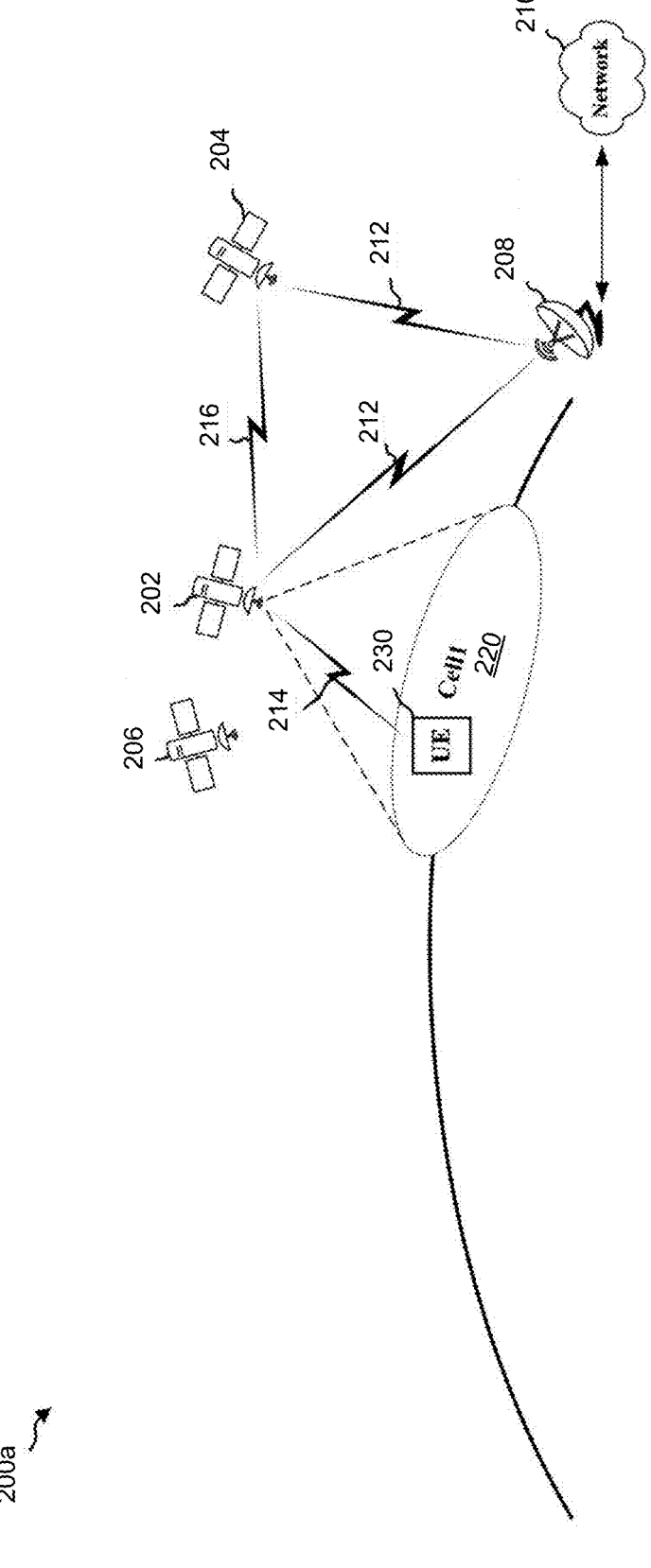
FIG. 2A is a diagram illustrating an example configuration of a Non-Terrestrial Network (NTN) for providing data network connectivity to terrestrial (ground-based) devices, in accordance with some examples.

FIG. 2A is a diagram illustrating an example configuration 200a of an NTN for providing data network connectivity to terrestrial (ground-based) devices. In one illustrative example, the NTN can be a satellite internet constellation, although various other NTNs and/or satellite constellation data network connectivity types may also be utilized without departing from the scope of the present disclosure. As used herein, the terms "NTN" and "satellite constellation" may be used interchangeably.

An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA) (e.g., in altitudes typically between 8 and 50 km including High Altitude Platforms (HAPs)).

A satellite constellation can include a plurality of satellites, such as the satellites 202, 204, and 206 depicted in FIG. 2A. The plurality of satellites can include satellites that are the same as one another and/or can include satellites that are different from one another. A terrestrial gateway 208 can be used to provide data connectivity to a data network 210. For instance, the terrestrial gateway 208 can be a ground station (e.g., internet gateway) for providing data connectivity to the internet. Also depicted in FIG. 2A is a UE 230 located on the surface of the earth, within a cell coverage area of the first satellite 202. In some aspects, the UE 230 can include various devices capable of connecting to the NTN 200a and/or the satellite constellation thereof for wireless communication.

The gateway 208 may be included in one or more terrestrial gateways that are used to connect the NTN 200a and/or satellite constellation thereof to a public data network such as the internet. In some examples, the gateway 208 may support functions to forward a signal from the satellite constellation to a Uu interface, such as an NR-Uu interface. In other examples, the gateway 208 may provide a transport network layer node, and may support various transport protocols, such as those associated with providing an IP router functionality. A satellite radio interface (SRI) may provide IP trunk connections between the gateway 208 and various satellites (e.g., satellites 202-206) to transport NG or F1 interfaces, respectively.

Satellites within the satellite constellation that are within connection range of the gateway 208 (e.g., within line-of-sight of, etc.) may be fed by the gateway 208. The individual satellites of the satellite constellation can be deployed across a satellite-targeted coverage area, which can correspond to regional, continental, or even global coverage. The satellites of the satellite constellation may be served successively by one or more gateways at a time. The NTN 200a associated with the satellite constellation can be configured to provide service and feeder link continuity between the successive serving gateways 208 with time duration to perform mobility anchoring and handover.

In one illustrative example, the first satellite 202 may communicate with the data network 210 (e.g., the internet) through a feeder link 212 established between the first satellite 202 and the gateway 208. The feeder link 212 can be used to provide bidirectional communications between the first satellite 202 and the internet backbone coupled to or otherwise provided by gateway 208. The first satellite 202 can communicate with the UE 230 using a service link 214 established within the cell coverage (e.g., field-of-view) area of an NTN cell 220. The NTN cell 220 corresponds to the first satellite 202. In particular, the first satellite 202 and/or service link 214 can be used to communicate with different devices or UEs that are located within the corresponding NTN cell 220 of first satellite 202.

More generally, a feeder link (such as feeder link 212) may refer to a wireless link between a gateway and a particular satellite of a satellite constellation. A service link (such as service link 214) may refer to a wireless link between a UE and particular satellite of a satellite constellation. In some examples, one or more (or all) of the satellites of a satellite constellation can use one or more directional beams (e.g., beamforming) to communicate with the UE 230 via service link 214 and/or to communicate with the ground station/internet gateway 208 via feeder link 212. For instance, the first satellite 202 may use directional beams (beamforming) to communicate with UE 230 via service link 214 and/or to communicate with gateway 208 via feeder link 212. A beam may refer to a wireless communication beam generated by an antenna on-board a satellite.

In some examples, the UE 230 may communicate with the first satellite 202 via the service link 214, as described above. Rather than the first satellite 202 then using the feeder link 212 to forward the UE communications to internet gateway 208, the first satellite 202 may instead relay the communication to second satellite 204 through an inter-satellite link (ISL) 216. The second satellite 204 can subsequently communicate with the data network 210 (e.g., internet) through a feeder link 212 established between the second satellite 204 and the internet gateway 208. In some aspects, the ISL links can be provided between a constellation of satellites and may involve the use of transparent payloads on-board the satellites. The ISL link may operate in an RF frequency or an optical band. In one illustrative example, the ISL links between satellites of a satellite constellation can be implemented as optical laser links (e.g., using optical space laser transceivers provided on the satellites), as was noted previously above.

In the illustrated example of FIG. 2A, the first satellite 202 may provide the NTN cell 220 with a first physical cell ID (PCI). In some examples, a constellation of satellites may provide coverage to the NTN cell 220. For example, the first satellite 202 may include a non-GEO device that does not appear stationary with respect to the Earth. For instance, the first satellite 202 can be a low-earth orbit (LEO) satellite included in a LEO satellite constellation for providing data network connectivity. As such, a satellite constellation (e.g., one or more satellites) may be configured to provide coverage to the NTN cell 220. For example, the first satellite 202, second satellite 204, and third satellite 206 may be part of a satellite constellation that provides coverage to the NTN cell 220.

In some examples, satellite constellation deployment may provide different services based on the type of payload onboard the satellite(s). The type of payload may determine whether the satellite acts as a relay node or a base station. For example, a transparent payload is associated with the satellite acting as a relay node, while a non-transparent payload is associated with the satellite acting as a base station. A transparent payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station (e.g., internet gateway 208) without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

A non-transparent payload may receive UL signals and demodulate or decode the UL signal before generating a DL signal. For instance, the first satellite 202 may receive UL signals from one or more served UEs (e.g., within the cell 220) and subsequently demodulate or decode the UL signals prior to generating one or more corresponding DL signals to the internet gateway 208. Similarly, the first satellite 202 may receive UL signals from the internet gateway 208 and subsequently demodulate or decode the UL signals prior to generating one or more corresponding DL signals to the served UEs within cell 220.

Satellite Internet Constellations

A satellite internet constellation is a fleet of satellite internet constellation satellites (also referred to as "birds") arranged in a low-earth orbit (LEO). Satellite internet constellations can be implemented based on the idea that, with a sufficiently large constellation, at any given time at least one satellite should be sufficiently close to communicate with both a user satellite dish and a satellite dish at an internet gateway. In such implementations, the internet gateway satellite dish is typically located in the same general vicinity (e.g., geographic area) as the user satellite dish because, as noted previously above, the same satellite is used to communicate with both the internet gateway and the user. Based on the same satellite communicating with both the user and the internet gateway, the satellite can be used to route (e.g., relay) internet traffic between the customer and the internet via the internet gateway.

Advantageously, users of such satellite internet constellations can connect to the internet without the requirement of having a physical connection to the internet gateway (although it is noted that the description herein may be applied equally to standalone satellite internet connectivity and/or satellite internet connectivity that is combined with other connectivity means such as WiFi/wireless, cellular, fiber optic and other wired connections, etc.) Satellite internet users are typically connected to an internet gateway via a series of intermediate connections (also referred to as hops).

In many cases, the direct physical connections between internet users and internet gateways are provided via internet service providers (ISPs), for example over fiber optic cables or copper lines. Satellite internet constellations (and the associated satellite internet service thereof) can be valuable for users for whom direct physical connections to an internet gateway are unavailable or otherwise prohibitively expensive. For instance, in some cases, users in rural or low density areas may not have access to the internet and/or may not have access to high-speed (e.g., fiber) internet because the cost of a ground-based physical connection to a gateway cannot be amortized over a sufficiently large quantity of users to justify the expense (e.g., as physical internet infrastructure is often built out by ISPs with the expectation of recouping the buildout cost via monthly internet service fees charged to its customers).

Satellite internet constellations and the associated satellite internet service (also referred to as "satellite internet connectivity" or "satellite connectivity") can also be valuable as a backup or secondary communication link. For instance, satellite connectivity can be used to augment communications performed over a direct physical connections such as fiber, with a portion of communications routed over a fiber link and a portion of communications routed over a satellite connectivity link. The satellite connectivity link can be configured as a secondary link, a primary link, etc. The satellite connectivity link can additionally, or alternatively, be configured as a backup link for communications failover or fallback in case of a degradation or other interruption to a primary communication link (e.g., a primary finer link, etc.).

Satellite internet constellations can provide internet access to both users who are adequately served by conventional/existing physical ground-based internet connections and to users who are not adequately served (if served at all) by the existing physical ground-based internet connections. In some cases, geographic considerations beyond population density can also be an impediment to providing ground-based internet connectivity. For instance, island or archipelago geographies may be densely populated but have a landmass that is spread across numerous islands—in this case, it is logistically challenging and financially cumbersome to run fiber connections to all of the islands. Accordingly, geographic considerations can also act as a barrier to using conventional ground-based physical connections between users and internet gateways.

Figure 2B:
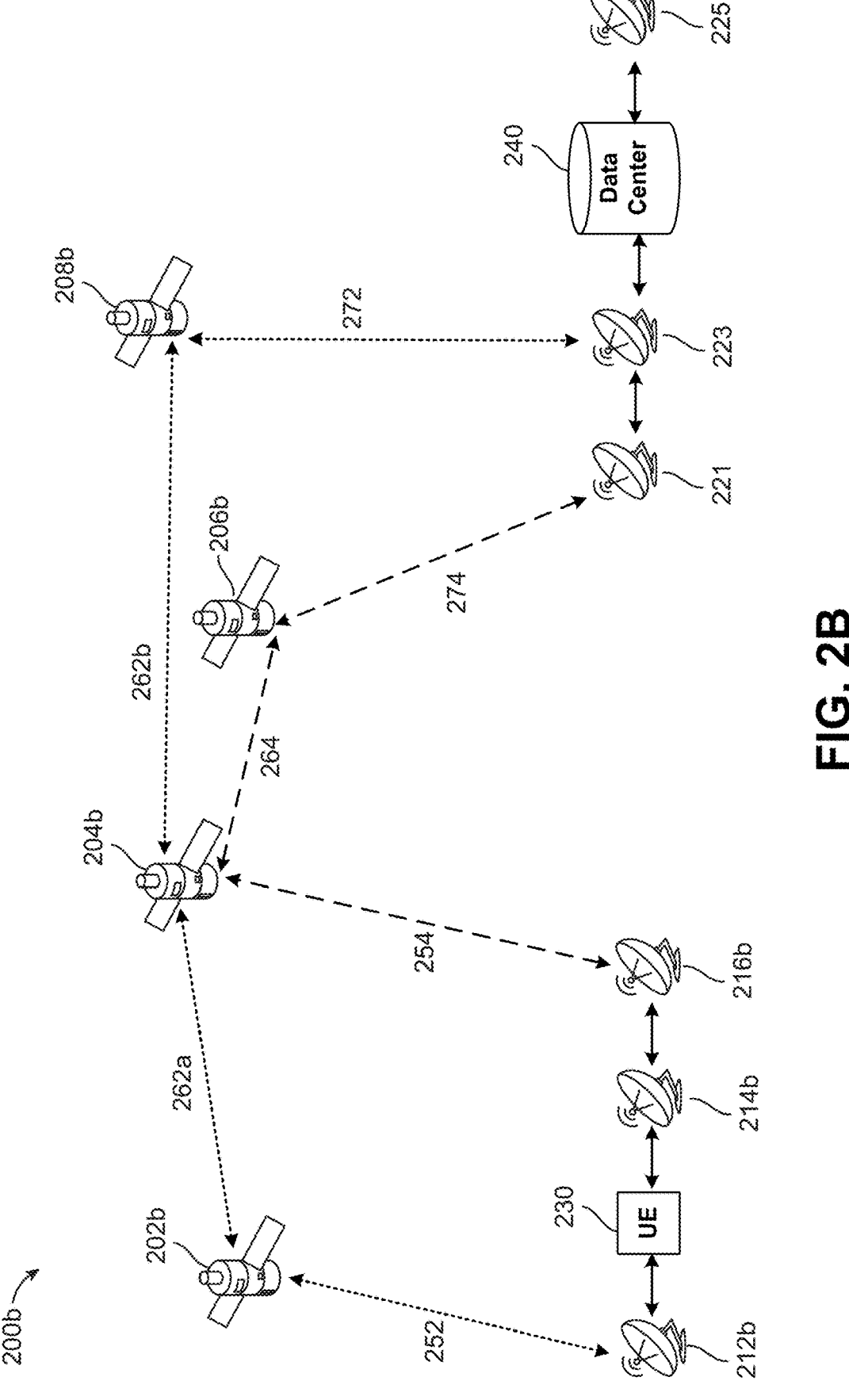
FIG. 2B is a diagram illustrating an example of a satellite internet constellation network that can be used to provide low latency satellite internet connectivity, in accordance with some examples.

FIG. 2B is a diagram illustrating an example of a satellite internet constellation network 200b, which in some aspects can be used to provide low latency satellite internet connectivity to a plurality of users. The plurality of users can be associated with a corresponding plurality of UEs, such as the UE 230 depicted in FIG. 2B. The UE(s) 230 can include various different computing devices and/or networking devices. In some embodiments, the UEs 230 can include any electronic device capable of connecting to a data network such as the internet.

The UE 230 can be associated with a plurality of client-side satellite internet constellation dishes, shown here as the satellite dishes 212b, 214b, and 216b, although it is noted that a greater or lesser quantity of satellite dishes can be used without departing from the scope of the disclosure. In one illustrative example, the UE 230 and the satellite dishes 212b, 214b, 216b can be associated with one another based on a common or proximate geographic location, area, region, etc. In other words, it is contemplated that a plurality of client-side satellite internet constellation dishes can be deployed to serve (e.g., provide connectivity to the satellite internet constellation) various different geographic areas, with various granularities as desired. For example, a group of satellite dishes can be deployed in and around a city, a town, a region, etc. The groups of satellite dishes can also be deployed in rural areas (e.g., lower-density concentrations of users). Multiple satellite dishes may be connected the same Edge Compute Unit to offer redundancy and resilience against outage, high latency, or low bandwidth.

In some cases, one or more satellite dishes (and/or groups thereof) can be deployed in remote areas that are distant from population centers, and in particular, that are distant from various types of infrastructure (e.g., including but not limited to electrical/power connectivity, internet and/or communication networking, compute capacity, reach of skilled personnel, access to road transportation, etc.).

The client-side satellite dishes 212b, 214b, 216b can communicate with a satellite internet constellation, shown in FIG. 2B as including a first satellite 202b, a second satellite 204b, a third satellite 206b, and a fourth satellite 204b. However, it is noted that a greater quantity of satellites can be used to implement the satellite internet constellation, with FIG. 2B presenting a simplified example for purposes of clarity of explanation.

Similarly, a plurality of server-side satellite internet constellation dishes 221, 223, 225 can be provided in association with various different gateways, such as the gateway 240 depicted in FIG. 2B. In some embodiments, the gateway 240 can be an internet gateway that provides connectivity to an internet backbone. In some aspects, the gateway 240 can be a data center or CDN that caches, hosts, stores, serves, or otherwise provides web content in response to receiving corresponding client requests for the content. It is again noted that a greater or lesser quantity of server-side satellite dishes can be utilized without departing from the scope of the present disclosure. As was described above with respect to the client-side satellite dishes 212b, 214b, 216b, the server-side satellite dishes 221, 223, 225 can be associated to a respective data center 240 based on a common or proximate geographic location, area, region, etc. In one illustrative example, the server-side satellite dishes 221, 223, 225 can be located at varying levels of proximity to the respective data center 240. For instance, an inner layer of server-side satellite dishes can include the satellite dishes 223 and 225, which may be provided at the closest physical distance to the data center 240. An outer layer of server-side satellite dishes can include at least the satellite dish 221, which is located at a greater distance away from the data center 240 relative to the inner layer dishes 223 and 225. In some embodiments, the outer layer satellite dishes can be communicatively coupled to the inner layer satellite dishes via a wired and/or wireless connection. For example, the outer layer server-side satellite dish 221 can be communicatively coupled to the inner layer server-side satellite dish 223 via a wireless microwave relay connection (among various other wireless/RF connections) and/or can be communicatively coupled to the inner layer server-side satellite dish 223 via a wired fiber connection.

By providing multiple different satellite dishes for communicating with the satellite internet constellation, at both the client-side associated with UE 230 and the server-side associated with datacenter 240, the systems and techniques described herein can increase the satellite constellation ground coverage area available to the UE 230 and to the datacenter 240. For instance, at the client-side associated with UE 230, the number of birds that are visible to or overhead the set of dishes 212b, 214b, 216b will almost always be greater than the number of birds that are visible to or otherwise overhead any individual one of the three client-side dishes 212*b*, 214*b*, 216*b*. Similarly, at the server-side associated with datacenter 240, the number of birds that are visible to or otherwise overhead the set of the three dishes 221, 223, 225 will almost always be greater than the number of birds that are visible to or otherwise overhead any individual one of the three server-side dishes 221, 223, 225.

The interconnecting of the satellite dishes at each respective client location and at each respective server location, when combined with a satellite internet constellation implement optical space lasers or other ISLs, can enable more direct connectivity between the UE 230 and the datacenter 240. For instance, the UE 230 may use satellite dish 212*b* to communicate with satellite 202*b*, via a service link 252. As illustrated, satellite 202*b* is out of range of the data center 240 (e.g., satellite 202*b* cannot establish a feeder link with any of the server-side dishes 221, 223, 225). In a conventional satellite internet constellation without ISLs, UE 230 would therefore be unable to use satellite 202*b* to obtain internet connectivity with data center 240 (based on the requirement in conventional satellite internet constellations that the same bird be used to connect the UE and an internet gateway).

Here, however, the UE 230 is able to establish internet connectivity with datacenter 240 via a first ISL 262*a* between satellite 202*b* and satellite 204*b*, a second ISL 262*b* between satellite 204*b* and satellite 208*b*, and a feeder link from satellite 208*b* to the server-side satellite dish 223. Notably, the UE 230 can establish internet connectivity with data center 240 via multiple different ISL-based paths through one different sets of birds of the satellite internet constellation. For instance, a first path from UE 230 to datacenter 240 is the combined path 252-262*a*-262*b*-272 described above. At least a second path from UE 230 to datacenter 240 may also be utilized. For example, the server-side dish 216*b* can communicate with satellite 204*b* via a service link 254, satellite 204*b* can communicate with satellite 206*b* via ISL 264, and satellite 206*b* can communicate with server-side dish 221 via feeder link 274.

Various other paths from the UE 230 to the datacenter 240 can also be utilized, with the two example paths of FIG. 2B provided for purposes of example and illustration, and not intended as limiting. For instance, the UE 230 can establish internet connectivity with datacenter 240 using a combination of: a particular service link selected from a plurality of available service links between one of the client-side dishes 212*b*, 214*b*, 216*b* to one of the birds of the constellation; one or more particular ISLs selected from a plurality of available ISLs between various combinations of two or more birds of the constellation; and a particular feeder link selected from a plurality of available feeder links between one of the birds of the constellation to one of the server-side dishes 221, 223, 225.

In some embodiments, the plurality of server-side satellite dishes (e.g., the dishes 221, 223, 225) can be located proximate to a datacenter, CDN, or other server-side proxy that serves internet content directly. In this example, the number of hops needed to provide internet connectivity to the UE 230 can be approximately equal to the 2+the number of ISLs in the path through the satellite constellation (e.g., 1× service link from UE 230 to the constellation, 1× feeder link from the constellation to the datacenter 240, and any ISLs taken between the service link satellite and the feeder link satellite).

In another example, the plurality of server-side satellite dishes (e.g., dishes 221, 223, 225) can be located proximate to a terrestrial internet gateway that connects via ground-based connections, such as fiber, to the corresponding datacenter, CDN, server-side proxy, etc., that hosts content requested by UE 230. For instance, one or more server-side satellite dishes can be provided proximate to multiple different terrestrial internet gateways. In this manner, the satellite internet constellation may, in some cases, analyze a client request from UE 230 to determine a particular terrestrial internet gateway that has the lowest latency to a proxy of the web server associated with the client request. Based on the analysis, the satellite internet constellation can determine one or more ISLs to route the client request to a bird that is overhead the identified gateway having the lowest latency to the proxy. In some examples, the satellite internet constellation can determine the lowest latency as the lowest latency from one of the terrestrial internet gateways to a proxy of the requested web server (e.g., without accounting for additional latency introduced by the number of ISLs or inter-satellite constellation hops needed to connect UE 230 to the lowest latency internet gateway). In other example, the satellite internet constellation can determine the lowest latency as being inclusive of both the latency through the ISL hops within the satellite constellation plus the latency through the one or more hops from a gateway to the proxy.

Notably, the systems and techniques described herein can be used to provide lower latency satellite internet by decoupling UE 230 from the limitation of only being able to connect to its local internet gateways. In some cases, the satellite internet constellation can receive signaling from one or more server-side proxies indicative of a current load, predicted load, etc., associated with each respective one of the server-side proxies. Based on the indicated load information for the proxies, the satellite internet constellation can more intelligently route internet traffic to gateways with proxies having sufficient capacity (and/or the most available capacity) to handle the traffic. For instance, the traffic-aware routing (e.g., load balancing) can be implemented in combination with the latency-based routing described above.

In some embodiments, the satellite internet constellation can be configured to inspect and/or analyze the contents of internet traffic from UE 230. For instance, if the satellite internet constellation can inspect the contents of client-side internet traffic, a web client (e.g., browser) and/or a satellite internet constellation client-side proxy can maintain a consistent/persistent secure connection with an appropriate gateway proxy, thereby reducing the number of roundtrips by approximately 60%. The roundtrip reduction of 60% may be in addition to the already reduced number of hops between the UE 230 and the datacenter 240.

Example Containerized Edge Data Center Unit

Figure 3A:
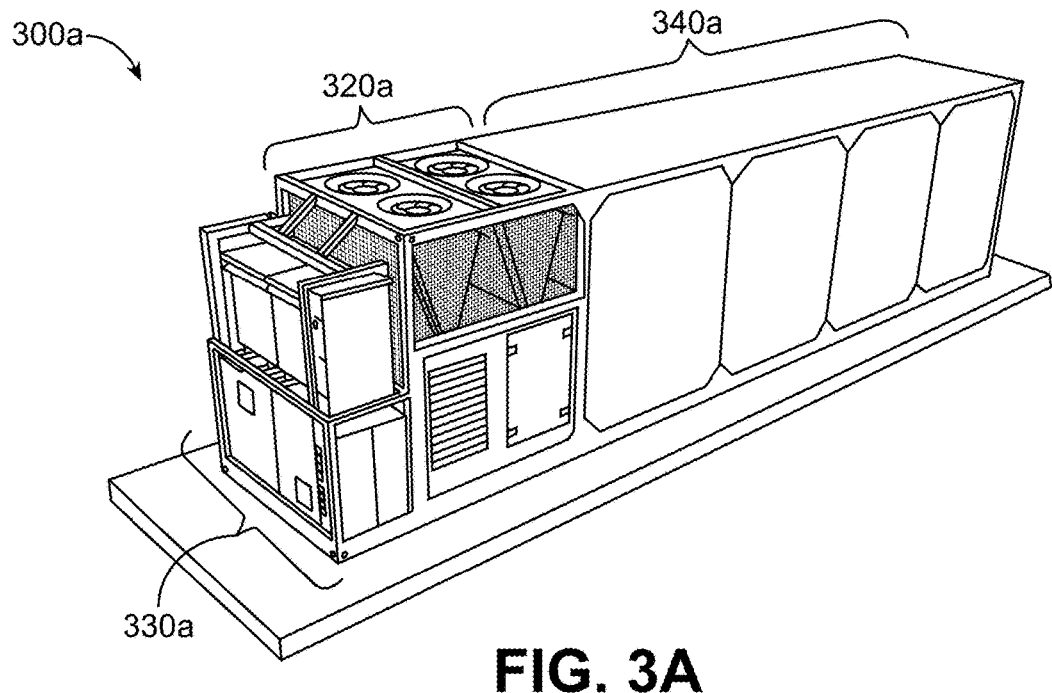
FIG. 3A is a diagram illustrating an example perspective view of a containerized data center unit for edge computing deployments, in accordance with some examples.
Figure 3B:
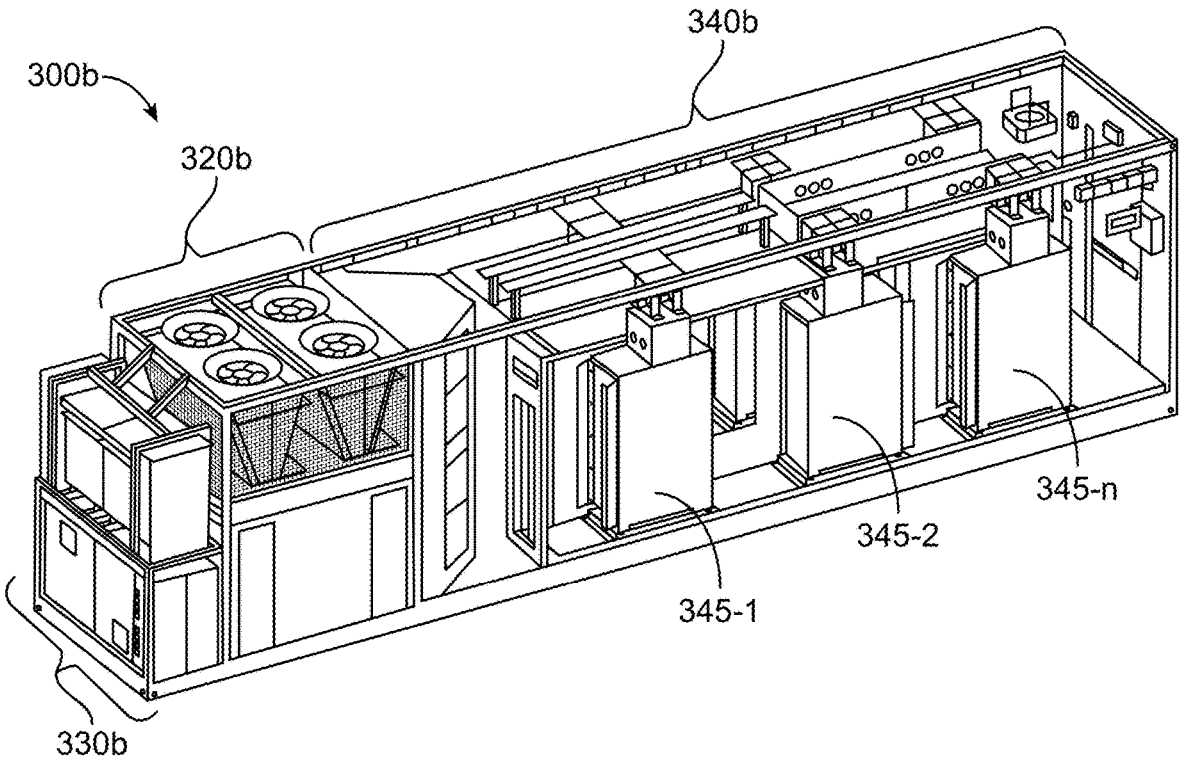
FIG. 3B is a diagram illustrating an interior perspective view of a containerized data center unit for edge computing deployments, in accordance with some examples.

FIG. 3A is a diagram illustrating an example perspective view of a containerized data center unit 300*a* for edge computing deployments, in accordance with some examples; and FIG. 3B is a diagram illustrating an interior perspective view of a containerized data center unit 300*b* for edge computing deployments, in accordance with some examples. In some embodiments, the containerized edge data center unit 300*a* of FIG. 3A can be the same as or similar to the containerized edge data center unit 300*b* of FIG. 3B.

As illustrated, the containerized edge data center unit 300*a* of FIG. 3A can include power distribution components 330*a* (e.g., also referred to as a power distribution system or module 330*a*), cooling or HVAC components 320*a* (e.g., also referred to as cooling/HVAC system or module 320*a*), and compute components or hardware 340*a* (e.g., also referred to as compute system or module 340*a*). Similarly, the containerized edge data center unit 300*b* of FIG. 3B can include power distribution components 330b that are the same as or similar to the power distribution components 330a of FIG. 3A; cooling/HVAC components 320b that are the same as or similar to the cooling/HVAC components 320a of FIG. 3A; and compute components 340b that are the same as or similar to the compute components 340a of FIG. 3A.

The containerized edge data center 300 can be configured to deliver enterprise-grade performance in remote environments with limited infrastructure and operations support. For instance, given remote deployment siting/locations, service calls (break-fix) service-level agreements (SLAs) may commonly extend to 24 hours or greater—and high-performance edge computing instances typically have a downtime tolerance that is significantly less than the service call or SLA window. Accordingly, it is contemplated that the containerized edge data center can be implemented with resiliency and redundancy to minimize or eliminate downtime, even in remote deployment locations, such that high-performance edge computing can be maintained without modification of existing service call or SLA response times. The containerized edge data center can provide deployment versatility in locales without constant (e.g., 24×7) support staff, without dedicated or conditioned spaces (e.g., without concrete pads, warehousing, sheltering, etc.), among various other deployment scenarios that typically are challenging for high-performance computing.

Critical infrastructure components of the containerized edge data center 300 can include one or more (or all) of the power distribution module 330, the cooling/HVAC module 320, and/or the compute module 340. Critical infrastructure may additionally, or alternatively, include HVAC, power distribution, control systems, environmental monitoring and control, etc. In one illustrative example, critical infrastructure components may be selected based upon ease and/or modularity of assembly, as well as constituent materials quality, so as to reduce or eliminate common failure modes that may be associated with conventional edge computing deployments. Sub-systems of the containerized edge data center 300 can include at least a portion of (or all of) one or more of the power distribution module 330, the cooling/HVAC module 320, and/or the compute module 340. In some embodiments, sub-systems of the containerized edge data center unit 300 can be selected based on serviceability by ubiquitous mechanical and electrical trades (e.g., containerized edge data center unit 300 can be designed to be serviceable in the field and/or at remote edge locations, without requiring specialized equipment, tools, knowledge, training, etc.).

In some aspects, containerized edge data center unit 300 can be implemented using a containerized and structural design (inside and out) that assumes or is at least compatible with a multiple deployment scenario or configuration (e.g., in which a particular containerized edge data center unit 300 is one of a plurality of containerized edge data center units 300 that are deployed within and included in an enterprise user's fleet). In some embodiments, the compute module 340 can include a plurality of compute hardware racks (e.g., 2×, 3×, 4×, 6×, etc., 42 U (or other size) racks). In some embodiments, each server rack within the compute module 340 can be configured with base-isolation on a per-rack level to provide isolation on some (or all) compute and networking hardware during both shipping/transportation as well as during deployment at the remote edge location.

In some examples, commodity and/or third-party compute, storage, and/or networking hardware can be utilized to provide various hardware configurations of the containerized edge data center units 300. For instance, third-party or commodify bare metal components can be used as a baseline hardware configuration for the compute, storage, and/or networking hardware of the containerized edge data center units 300, and may be integrated with the ISO-conformal containerized housing at the time of manufacture. In some aspects, different configurations of the hardware of containerized edge data center units 300 can be provided, as noted previously above, based on factors such as industry use-case, edge deployment site or location characteristics, existing infrastructure and utility support or availability, etc. In some aspects, some (or all) of the hardware configuration for one or more of the power distribution components 330, cooling/HVAC components 320, and/or compute components 340 can be customizable based on configuration or selection preferences indicated by an end user or customer that will take delivery of a particular containerized edge data center unit 300. For example, an end user or customer request corresponding to a particular hardware configuration of a containerized edge data center unit 300 may correspond to a request for hyperconverged infrastructure (e.g., Dell, HP, Azure, etc., among various other examples). In some embodiments, at least a portion of the hardware components of the containerized edge data center unit 300 (e.g., at least a portion of one or more of the power distribution module 330, cooling/HVAC module 320, compute module 340, and/or various other systems or modules such as command and control, critical systems or environmental monitoring, etc.) may be custom-designed at the chassis and/or silicon layers of the containerized edge data center unit 300, thereby providing cost and/or performance advantages over commodity or third-party hardware implementations of like components.

A containerized edge data center unit 300 can be pre-configured at the factory (e.g., at the time of manufacture or end user build-out) with the corresponding communications hardware and/or software to support multiple and various types, modes, modalities, etc., of wired and/or wireless communication. For instance, the containerized edge data center unit 300 can include one or more networked communications modules to provide backhaul connectivity (e.g., from the containerized edge data center unit 300 to a cloud or public network such as the internet, etc.) and can include one or more networked communications modules to provide local network connectivity between the containerized edge data center unit 300 and one or more edge sensors or edge assets that are collocated with the containerized edge data center unit 300 at the same edge deployment site or location.

In one illustrative example, the containerized edge data center unit 300 can use a first set of one or more networked communications modules to provide wired or wireless backhaul data network connectivity. For instance, the backhaul can be an internet backhaul, which may be implemented using one or more of a fiber communication link (e.g., wired fiber optic connectivity from the local site/edge compute unit 300 to internet infrastructure that is connectable to a desired remote location or server; a direct or point-to-point wired fiber optic connectivity from the local site/edge compute unit 300 to the desired remote location or server; etc.). The internet backhaul may additionally, or alternatively, be implemented using one or more satellite communication links. For instance, internet backhaul can be a wireless communication link between edge compute unit 300 and a satellite of a satellite internet constellation. In some aspects, it is contemplated that the edge compute unit 300 can include (or otherwise be associated with) one or more satellite transceivers for implementing satellite connectivity to and/or from the edge compute unit 300. In some aspects, the one or more satellite transceivers can be integrated in or coupled to a housing (e.g., container, where edge compute unit 300 is a containerized data center) of the edge compute unit 300 and used to provide satellite connectivity capable of implementing the internet backhaul network capability. In another example, the one or more satellite transceivers can additionally, or alternatively, be provided at the local edge site where edge compute unit 300 is deployed.

The containerized edge data center unit 300 can use a second set of one or more networked communications modules to provide wired or wireless local data network connectivity between the containerized edge data center unit and various sensors, edge assets, IoT devices, and various other computing devices and/or networked devices that are associated with the same edge site deployment location as the containerized edge data center unit 300. For instance.

A local network connectivity module can be used to provide one or more communication links between the edge compute unit 300 and respective ones of a plurality of edge assets/sensors/devices etc. In one illustrative example, a local network connectivity module of the containerized edge compute unit 300 can be used to implement local network connectivity based on a private LTE, 3G, 5G or other private cellular network; based on a public LTE, 3G, 5G or other public cellular network; based on a WiFi, Bluetooth, Zigbee, Z-wave, Long Range (LoRa), Sigfox, Narrowband-IoT (NB-IoT), LTE for Machines (LTE-M), IPv6 Thread, or other short-range wireless network; based on a local wired or fiber-optic network; etc. The edge compute unit 300 can receive different types of data from different ones of the edge assets/sensors collocated at the same edge location (or otherwise associated with and communicatively coupled with the containerized edge compute unit 300) and can transmit different types of configurations/controls to different ones of the edge assets/sensors. For instance, the edge compute unit 300 can receive onboard camera feed and other sensor information (including SLAM sensor information) from one or more autonomous robots, drones, etc., and can transmit in response routing instructions to the autonomous robots or drones etc. in response. The routing instructions can be generated or otherwise determined based on processing the onboard camera feed data from the autonomous robots using an appropriate one (or more) trained AI/ML models deployed on or to the containerized edge compute unit 300 (e.g., deployed on or to the compute module 340).

In some embodiments, the compute module 340 of the containerized edge data center unit 300 can be configured as a combined compute and networking module or unit. The compute module/networking unit 340 of the containerized edge data center unit 300 can include computing hardware for providing edge computing and/or data services at the containerized edge data center unit 300. In one illustrative example, the compute/networking unit 340 (referred to interchangeably as a "compute unit" or a "networking unit" herein) can include a plurality of servers and/or server racks. As depicted in FIGS. 3A and 3B, the compute unit 340 can include a first server rack 345-1, a second server rack 345-2, . . . , and an n$^{th}$ server rack 345-n. The server racks can each include same or similar hardware. In some embodiments, different server racks of the plurality of server racks can each be associated with different hardware configurations.

In some embodiments, the server racks 345-1, . . . , 345-n can be implemented as conventional vertical server racks in which individual servers are vertically stacked atop one another. In other examples, the server racks 345-1, . . . ,

345-n can be provided in a more horizontally distributed manner, either without maximizing the total available vertical space within the containerized housing of the edge compute unit 300 or with minimal vertical stacking of servers (or even no vertical stacking of servers). For instance, the server racks 345-1, . . . , 345-n may, in some aspects or implementations, comprise flattened implementations of standard vertical server racks, with a plurality of servers and/or motherboards spatially distributed across the horizontal surface area of the floor of the containerized housing of the edge compute unit 300. In some embodiments, each respective one of the server racks 345-1, . . . , 345-n (and/or some or all of the constituent servers or motherboards of each server rack, etc.) can be associated with or otherwise coupled to a corresponding one or more heatsinks and/or cooling means (e.g., included in the cooling/HVAC module(s) 320, etc.) for efficiently dissipating waste heat and maintaining high-performance computation. In some aspects, the server racks 345-1, . . . , 345-n may be implemented using horizontally distributed motherboards spread out along the bottom surface of the containerized housing of the containerized edge data center unit 300 and coupled to corresponding heatsinks on the bottom surface of the containerized housing.

In general, it is contemplated that the compute module 340 and/or the constituent server racks 345-1, . . . , 345-n can be configured to include various combinations of CPUs, GPUs, NPUs, ASICs, and/or various other computing hardware associated with a particular deployment scenario of the containerized edge computing apparatus 300. In some embodiments, the compute/networking unit 340 can include one or more data storage modules, which can provide onboard and/or local database storage using HDDs, SSDs, or combinations of the two. In some aspects, one or more server racks (of the plurality of server racks 345-1, . . . , 345-n) can be implemented either wholly or partially as data storage racks. In some examples, each respective server rack of the plurality of server racks 345-1, . . . , 345-n can include at least one data storage module, with data storage functionality distributed across the plurality of server racks 345-1, . . . , 345-n-n. In some embodiments, the compute/networking unit 340 can be configured to include multiple petabytes of SSD and/or HDD data storage, although greater or lesser storage capacities can also be utilized without departing from the scope of the present disclosure.

In some aspects, commodity-grade networking switches and/or network switching hardware can be included in the containerized edge data center unit 300 and used to support multiple connectivity modes and platforms (e.g., satellite internet constellation, ethernet/trench fiber, 5G or cellular), such that the containerized edge compute unit 300 is highly flexible and adaptable to all remote site conditions, bandwidth fluctuations, etc.

For instance, one or more communications or networking modules of the containerized edge data center unit 300 can be used to perform wired and/or wireless communications over one or more communications media or modalities. For example, a communications or networking module of the containerized edge data center unit 300 can be used to implement a data downlink (DL) and a data uplink (UL), for both internet/backhaul communications and for local network communications. In one illustrative example, a communications/networking module of the containerized edge data center unit 300 can include one or more satellite transceivers (e.g., also referred to herein as satellite dishes), such as a first satellite dish/transceiver and a second satellite dish/transceiver. In some embodiments, each respective satellite transceiver of the one or more satellite transceivers can be configured for bidirectional communications (e.g., capable of receiving via data downlink and capable of transmitting via data uplink). In some aspects, a first satellite transceiver may be configured as a receiver only, with a remaining satellite transceiver configured as a transmitter only. Each of the satellite transceivers of the containerized edge data center unit 300 can communicate with one or more satellite constellations.

In some embodiments, a communications module of the containerized edge data center unit 300 can include an internal switching, tasking, and routing sub-system that is communicatively coupled to the networked communications modules and used to provide a network link thereof to the containerized edge data center unit 300. Although not illustrated, it is appreciated that the communications module and/or the internal switching, tasking, and routing sub-system(s) thereof can be configured to provide network links to one or more (or all) of the remaining components of the containerized edge data center unit 300, for example to provide control commands from a remote user or operator. In some cases, the communications module can include one or more antennas and/or transceivers for implementing communication types other than the satellite data network communications implemented via the one or more satellite transceivers and associated satellite internet constellations. For instance, the communications module(s) of the containerized edge data center unit 300 can include one or more antennas or transceivers for providing beamforming radio frequency (RF) signal connections. In some embodiments, beamforming RF connections can be utilized to provide wireless communications between a plurality of containerized edge data center units 300 that are within the same general area or otherwise within radio communications range. In some examples, a plurality of beamforming RF connections formed between respective pairs of the containerized edge data center units 300 can be used as an ad-hoc network to relay communications to a ground-based internet gateway. For example, beamforming RF radio connections can be used to relay communications from various containerized edge data center units 300 to one or more ground-based internet gateways that would otherwise be reachable via the satellite internet constellation (e.g., beamforming RF radio relay connections can be used as a backup or failover mechanism for the containerized edge data center unit 300 to reach an internet gateway when satellite communications are unavailable or otherwise not functioning correctly). In some aspects, local radio connections between the containerized edge data center units 300 can be seen to enable low latency connectivity between a plurality (e.g., a fleet) of the containerized edge data center units 300 deployed within a given geographical area or region.

In one illustrative example, various functionalities described above and herein with respect to the containerized edge data center unit 300 can be distributed over the particular units included in a given fleet. For instance, each containerized edge data center unit 300 may include an RF relay radio or various other transceivers for implementing backhaul or point-to-point links between the individual units included in the fleet. However, in some examples only a subset of the containerized edge data center units 300 included in a fleet may need to be equipped with satellite transceivers for communicating with a satellite internet constellation. For instance, a containerized edge data center unit 300 that does not include satellite transceivers may nevertheless communicate with the satellite internet constellation by remaining within RF relay range of one or more containerized edge data center units 300 that do include a satellite transceiver.

Figure 4:
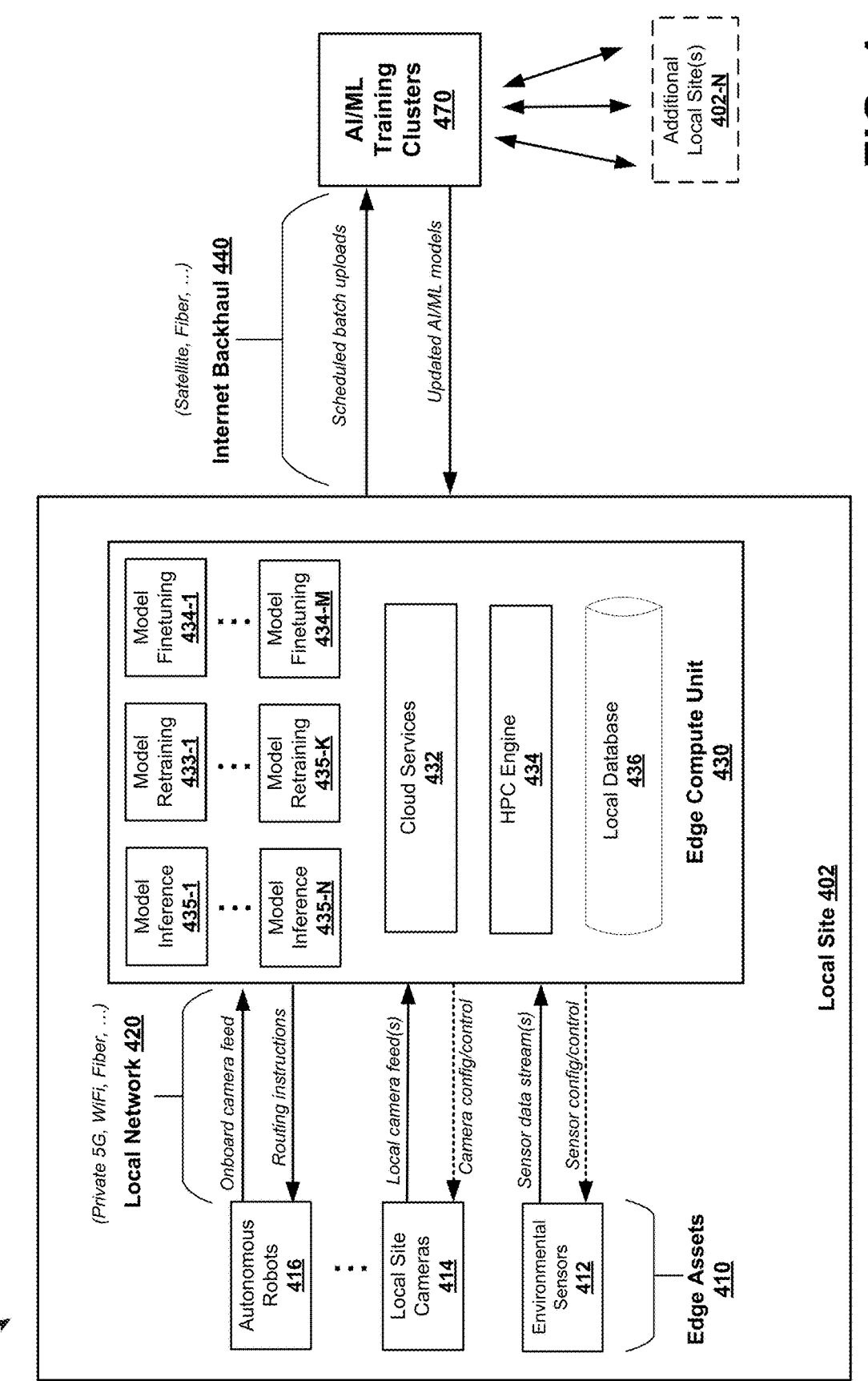
FIG. 4 is a diagram illustrating an example of an edge computing system for machine learning (ML) and/or artificial intelligence (AI) workloads, where the edge computing system includes one or more local sites each having one or more edge compute units, in accordance with some examples.

FIG. 4 is a diagram illustrating an example of an edge computing system 400 that can be associated with and/or can be used to implement or perform one or more aspects of the present disclosure. In some embodiments, the edge compute unit 430 can also be referred to as an "edge device." In some aspects, edge compute unit 430 can be provided as a high-performance compute and storage (HPCS) and/or elastic-HPCS (E-HPCS) edge device.

For example, a local site 402 can be one of a plurality of edge environments/edge deployments associated with edge computing system 400. The plurality of local sites can include the local site 402 and some quantity N of additional local sites 402-N, each of which may be the same as or similar to the local site 402. The local site 402 can be a geographic location associated with an enterprise user or other user of edge computing. The local site 402 can also be an edge location in terms of data network connectivity (i.e., edge environment 402 is both a local geographic location of an enterprise user and is an edge location in the corresponding data network topography).

In the example of FIG. 4, the edge environment 402 includes one or more edge compute units 430. Each edge compute unit 430 can be configured as a containerized edge compute unit or data center for implementing sensor data generation or ingestion and inference for one or more trained ML/AI models provided on the edge compute unit 430. For instance, edge compute unit 430 can include computational hardware components configured to perform inference for one or more trained AI/ML models. As illustrated, a first portion of the edge compute unit 430 hardware resources can be associated with or used to implement inference for a first AI/ML model 435-1, . . . , and an $N^{th}$ AI/ML model 435-N. In other words, the edge compute unit 430 can be configured with compute hardware and compute capacity for implementing inference using a plurality of different AI/ML models. Inference for the plurality of AI/ML models can be performed simultaneously or in parallel for multiple ones of the N AI/ML models 435-1, . . . 435-N. In some aspects, inference can be performed for a first subset of the N AI/ML models for a first portion of time, can be performed for a second subset of the N AI/ML models for a second portion of time, etc. The first and second subsets of the AI/ML models can be disjoint or overlapping.

In some aspects, the edge compute unit 430 can be associated with performing one or more (or all) of on-premises training (or retraining) of one or more AI/ML models of the plurality of AI/ML models, performing fine-tuning of one or more AI/ML models of the plurality of AI/ML models, and/or performing instruction tuning of one or more AI/ML models of the plurality of AI/ML models. For instance, a subset of the plurality of AI/ML models that are deployed to (or are otherwise deployable to) the edge compute unit 430 may be trained or fine-tuned on-premises at the local edge site 402, without any dependence on the cloud (e.g., without dependence on the cloud-based AI/ML training clusters implemented within the cloud user environment 470). In some aspects, the edge compute unit 430 can perform the on-premises training or retraining, fine-tuning, and/or instruction tuning of the one or more AI/ML models of the plurality of AI/ML models to account for model degradation or drift over time. In some examples, the edge compute unit 430 can perform the one-premises training or retraining, fine-tuning, and/or instruction tuning of the one or more AI/ML models of the plurality of AI/ML models in order to adapt a respective AI/ML model to a new or differentiated task from which the respective model was originally trained (e.g., pre-trained).

In some cases, fine-tuning of an AI/ML model can be performed in the cloud (e.g., using the cloud-based AI/ML training clusters implemented within the cloud user environment 470), can be performed at the edge (e.g., at local edge environment 402, using edge compute unit 430 and AI/ML model finetuning 434-1, . . . , 434-M), and/or can be performed using a distributed combination over the cloud and one or more edge compute units 430. In some cases, fine-tuning of an AI/ML model can be performed in either the cloud or the edge environment 402 (or both), based on the use of significantly less compute power and data to perform finetuning and/or instruction tuning of a trained AI/ML model to a specific task, as compared to the compute power and data needed to originally train the AI/ML model to either the specific task or a broader class of tasks that includes the specific task.

In some embodiments, edge compute unit 430 can include computational hardware components that can be configured to perform training, retraining, finetuning, etc., for one or more trained AI/ML models. In some aspects, at least a portion of the computational hardware components of edge compute unit 430 used to implement the AI/ML model inference 435-1, . . . , 435-N can also be utilized to perform AI/ML model retraining 433-1, . . . , 433-K and/or to perform AI/ML model finetuning 434-1, . . . , 434-M. For example, computational hardware components (e.g., CPUs, GPUs, NPUs, hardware accelerators, etc.) included in the edge compute unit 430 may be configured to perform various combinations of model inference, model retraining, and/or model finetuning at the edge (e.g., at the local edge site 402). At least a portion of the K AI/ML models 433-1, . . . , 433-K associated with model retraining at the edge can be included in the N AI/ML models associated with model inference at the edge. Similarly, at least a portion of the M AI/ML models 434-1, . . . , 434-M associated with model finetuning at the edge can be included in the N AI/ML models associated with model inference at the edge.

In some embodiments, for a given pre-trained AI/ML model received at the edge compute unit 430 (e.g., received from the AI/ML training clusters in the cloud user environments 470), the edge compute unit 430 can be configured to perform one or more (or all) of model inference 435, model retraining 433, and/or model finetuning 434 at the edge.

As illustrated in FIG. 4, retraining for a plurality of AI/ML models can be performed simultaneously or in parallel for multiple ones of the K AI/ML models 433-1, . . . , 435-K (which as noted above can be the same as or similar to the N AI/ML models 435-1, . . . , 435-N, or may be different; and/or can be the same as or similar to the M AI/ML models 434-1, . . . , 434-M, or may be different). In some aspects, retraining can be performed for a first subset of the K AI/ML models for a first portion of time, can be performed for a second subset of the K AI/ML models for a second portion of time, etc. The first and second subsets of the K AI/ML models can be disjoint or overlapping. Additionally, or alternatively, finetuning for a plurality of AI/ML models can be performed simultaneously or in parallel for multiple ones of the MAI/ML models 434-1, . . . , 434-M (which can be the same as, similar to, or disjoint from the N AI/ML models 435 and/or the K AI/ML models 433). In some aspects, finetuning can be performed for a first subset of the M AI/ML models for a first portion of time, can be performed for a second subset of the M AI/ML models for a second portion of time, etc. The first and second subsets of the MAI/ML models can be disjoint or overlapping.

Each edge compute unit 430 of the one or more edge compute units provided at each edge environment 402 of the plurality of edge environments 402-N can additionally include cloud services 432, a high-performance compute (HPC) engine 434, and a local database 436. In some aspects, HPC engine 434 can be used to implement and/or manage inference associated with respective ones of the trained AI/ML models 435-1, . . . , 435-N provided on the edge compute unit 430.

In one illustrative example, the edge compute unit 430 can receive the trained AI/ML models 435-1, . . . , 435-N from a centralized AI/ML training cluster or engine that is provided by one or more cloud user environments 470. The AI/ML training clusters of the cloud user environment 470 can be used to perform training (e.g., pre-training) of AI/ML models that can later be deployed to the edge compute unit 430 for inference and/or other implementations at the edge environment 402. Data network connectivity between edge compute unit 430 and cloud user environments 470 can be provided using one or more internet backhaul communication links 440. For instance, the internet backhaul 440 can be implemented as a fiber communication link (e.g., wired fiber optic connectivity from the edge environment 402/edge compute unit 430 to internet infrastructure that is connectable to the cloud user environments 470; a direct or point-to-point wired fiber optic connectivity from the edge environment 402/edge compute unit 430 to the cloud user environments 470; etc.).

The internet backhaul 440 may additionally, or alternatively, be implemented using one or more satellite communication links. For instance, internet backhaul 440 can be a wireless communication link between edge compute unit 430/edge environment 402 and a satellite of a satellite internet constellation. In some aspects, it is contemplated that the edge compute unit 430 can include (or otherwise be associated with) one or more satellite transceivers for implementing satellite connectivity to and/or from the edge compute unit 430. In some aspects, the one or more satellite transceivers can be integrated in or coupled to a housing (e.g., container, in examples where edge compute unit 430 is a containerized data center) of the edge compute unit 430 and used to provide satellite connectivity capable of implementing the internet backhaul link 440. In another example, the one or more satellite transceivers can additionally, or alternatively, be provided at the edge environment 402 where edge compute unit 430 is deployed.

In some aspects, the internet backhaul link 440 between edge compute unit 430 and cloud user environments 470 can be used to provide uplink (e.g., from edge compute unit 430 to cloud user environments 470) of scheduled batch uploads of information corresponding to one or more of the AI/ML models 435-1, . . . , 435-N implemented by the edge compute unit 430, corresponding to one or more features (intermediate or output) generated by the AI/ML models implemented by edge compute unit 430, and/or corresponding to one or more sensor data streams generated by edge assets 410 provided at edge environment 402 and associated with the edge compute unit 430, etc. The internet backhaul link 440 may additionally be used to provide downlink (e.g., from cloud user environments 470 to edge compute unit 430) of updated, re-trained, fine-tuned, etc., AI/ML models. For instance, the updated, re-trained, or fine-tuned AI/ML models transmitted over internet backhaul link 440 from cloud user environments 470 to edge compute unit 430 can be updated, re-trained, or fine-tuned based on the scheduled batch upload data transmitted on the uplink from edge compute unit 430 to cloud user environments 470. In some aspects, the updated AI/ML models transmitted from cloud user environments 470 to edge compute unit 430 can be updated versions of the same AI/ML models 435-1, . . . , 435-N already implemented on the edge compute unit 430 (e.g., already stored in local database 436 for implementation on edge compute unit 430). In other examples, the updated AI/ML models transmitted from cloud user environments 470 to edge compute unit 430 can include one or more new AI/ML models that are not currently (and/or were not previously) included in the set of AI/ML models 435-1, . . . , 435-N that are either implemented on edge compute unit 430 or stored in local database 436 for potential implementation on edge compute unit 430.

In some cases, the AI/ML distributed computation platform 400 can use the one or more edge compute units 430 provided at each edge environment 402 to perform local data capture and transmission. In particular, the locally captured data can be obtained from one or more local sensors and/or other edge assets 410 provided at the edge environment 402. For instance, in the example of FIG. 4, the local edge assets/sensors 402 can include, but are not limited to, one or more autonomous robots 416, one or more local site cameras 414, one or more environmental sensors 412, etc. The local sensors and edge assets 410 can communicate with the edge compute unit 430 via a local network 420 implemented at or for edge environment 402.

In another example, the edge compute unit 430 can receive local camera feed(s) information from the local site cameras 414 and can transmit in response camera configuration and/or control information to the local site cameras 414. In some cases, the edge compute unit 430 may receive the local camera feed(s) information from the local site cameras 414 and transmit nothing in response. For instance, the camera configuration and/or control information can be used to re-position or re-configure one or more image capture parameters of the local site cameras 414—if no re-positioning or image capture parameter reconfiguration is needed, the edge compute unit 430 may not transmit any camera configuration/control information in response. In some aspects, the camera configuration and/or control information can be generated or otherwise determined based on processing the local camera feed data from the local site cameras 414 using an appropriate one (or more) of the trained AI/ML models 435-1, . . . , 435-N implemented on the edge compute unit 430 and/or using the HPC engine 434 of the edge compute unit 430.

In another example, the edge compute unit 430 can receive environmental sensor data stream(s) information from the environmental sensors 412 and can transmit in response sensor configuration/control information to the environmental sensors 412. In some cases, the edge compute unit 430 may receive the sensor data streams information from the environmental sensors 412 and transmit nothing in response. For instance, the sensor configuration and/or control information can be used to adjust or re-configure one or more sensor data ingestion parameters of the environmental sensors 412—if no adjustment or re-configuration of the environmental sensors 412 is needed, the edge compute unit 430 may not transmit any sensor configuration/control information in response. In some aspects, the sensor configuration and/or control information can be generated or otherwise determined based on processing the local environmental sensor data streams from the environmental sensors 412 using an appropriate one (or more) of the trained AI/ML models 435-1, . . . , 435-N implemented on the edge compute unit 430 and/or using the HPC engine 434 of the edge compute unit 430.

In some examples, the systems and techniques described herein can be used to drive local storage, inference, prediction, and/or response, performed by an edge compute unit (e.g., edge compute unit 430) with minimal or no reliance on cloud communications or cloud offloading of the computational workload (e.g., to cloud user environments 470). The edge compute unit 430 can additionally be used to locally perform tasks such as background/batch data cleaning, ETL, feature extraction, etc. The local edge compute unit 430 may perform inference and generate prediction or inference results locally, for instance using one or more of the trained (e.g., pre-trained) AI/ML models 435-1, . . . , 435-N received by edge compute unit 430 from cloud user environments 470. The local edge compute unit 430 may perform further finetuning or instruction tuning of the pre-trained model to a specified task (e.g., corresponding one or more of the AI/ML model finetuning instances 433-1, . . . , 4333-M, as described previously above).

The prediction or inference results (and/or intermediate features, associated data, etc.) can be compressed and periodically uploaded by edge compute unit 430 to the cloud or other centralized location (e.g., such as cloud user environments 470 etc.). In one illustrative example, the compressed prediction or inference results can be uploaded to the cloud via a satellite communication link, such as a communication link to a satellite internet constellation configured to provide wireless satellite connectivity between the edge compute unit and existing terrestrial internet infrastructure. For instance, the compressed prediction or inference results can be included in the scheduled batch uploads transmitted over internet backhaul link 440 from edge compute unit 430 to cloud user environments 470. In some cases, the prediction or inference results can be utilized immediately at the edge compute unit 430, and may later be transmitted (in compressed form) to the cloud or centralized location (e.g., cloud user environments 470). In some aspects, satellite connectivity can be used to provide periodic transmission or upload of compressed prediction or inference results, such as periodic transmission during high-bandwidth or low-cost availability hours of the satellite internet constellation. In some cases, some (or all) of the compressed prediction or inference results can be transmitted and/or re-transmitted using wired or wireless backhaul means where available, including fiber-optic connectivity for internet backhaul, etc.

Notably, the systems and techniques can implement the tasks and operations described above locally onboard one or more edge compute units 430, while offloading more computationally intensive and/or less time-sensitive tasks from the edge compute unit to AI/ML training clusters in the cloud user environments 470. For instance, the AI/ML training clusters can be used to provide on-demand AI/ML model training and fine tuning, corresponding to the updated AI/ML models shown in FIG. 4 as being transmitted from cloud user environments 470 to edge compute unit 430 via internet backhaul 440. In some aspects, the AI/ML training clusters can implement thousands of GPUs or other high-performance compute hardware, capable of training or fine-tuning an AI/ML model using thousands of GPUs for extended periods of time (e.g., days, weeks, or longer, etc.). In some aspects, AI/ML training clusters can additionally, or alternatively, be used to perform on-cloud model compression and optimization prior to transmitting data indicative of the trained AI/ML models 435-1, . . . , 435-N to the edge compute unit 430 for local implementation using the sensor data generated by the associated edge assets 410. In some embodiments, the edge compute unit 430 can be configured to perform a scheduled or periodic download of fresh (e.g., updated or new) AI/ML models from AI/ML training clusters 470 via the internet backhaul link 440 (e.g., the updated or new AI/ML models can be distributed from AI/ML training clusters in the cloud user environments 470 to edge compute unit 430 in a pull fashion). In other examples, the updated or new AI/ML models can be distributed from AI/ML training clusters in the cloud user environments 470 to edge compute unit 430 in a push fashion, wherein the AI/ML training clusters 470 transmit the updated or new models to the edge compute unit 430 via internet backhaul link 440 as soon as the updated or new AI/ML model becomes available at the AI/ML training clusters.

Training the AI/ML models 435-1, . . . , 435-N may require massive amounts of data and processing power, which can be more efficiently implemented at the cloud user environments 470 (and shared across the plurality of edge environment 402-N edge compute units 430) rather than implementing individually at each of the edge environments 402-N and corresponding edge compute unit(s) 430. In some aspects, the quality of an AI/ML model can be directly correlated with the size of the training and testing (e.g., validation) data used to perform the training and subsequent finetuning. Furthermore, in many cases, training large AI/ML models requires running thousands of GPUs, ingesting hundreds of terabytes of data, and performing these processes over the course of several weeks. Accordingly, in many cases, large-scale ML/AI model training is suited best for cloud or on-premises infrastructure and sophisticated MLOPs. For instance, the training dataset associated with training a large-scale AI/ML model can be on the order of hundreds of TB-tens of petabytes (PB), or even larger. Thousands of GPUs and hours to weeks of training time can be needed, with the resulting size of the uncompressed, trained model exceeding hundreds or thousands of GB.

ML or AI inference (e.g., inference using a trained ML or AI model), on the other hand, can be implemented using far fewer resources than training, and may performed efficiently at the edge (e.g., by edge compute unit(s) 430 associated with the local site(s) 402 or 402-N). Indeed, in many cases, edge inferencing will provide better latency than cloud inferencing, as input sensor data generated at the edge (e.g., using edge assets 410) does not need to transit over an internet backhaul link 440 to the cloud region (e.g., cloud user environments 470 associated with the AI/ML training clusters) before inference can begin. Accordingly, it is contemplated herein that the trained AI/ML models 435-1, . . . , 435-N can be created and trained in the cloud (e.g., at AI/ML training clusters implemented within the cloud user environment 470), and additionally can be optimized and compressed significantly, enabling the systems and techniques described herein to distribute the optimized, compressed, and trained AI/ML models 435-1, . . . , 435-N to the edge locations associated with local sites 402 and corresponding edge compute unit(s) 430 where the optimized, compressed, and trained AI/ML models will be implemented for inferencing at the edge using local sensor data from edge assets 410. As noted previously above, in some aspects, one or more of the trained models (e.g., one or more of the trained AI/ML models 435-1, . . . , 435-N deployed to the edge compute unit 430 for local edge inference) can be fine-tuned or instruction tuned to specific tasks, a technique which requires significantly less data and compute than their training. For instance, a trained (e.g., pre-trained) AI/ML model can be fine-tuned or instruction tuned to specific tasks including new and/or differentiated tasks relative to the task(s) originally or previously corresponding to the trained model. In some examples, a trained (e.g., pre-trained) AI/ML model can be fine-tuned or instruction tuned to specific tasks using one or more of the model retraining instances 433-1, . . . , 433-K and/or using one or more of the model finetuning instances 434-1, . . . , 434-M implemented locally by the edge compute unit 430, as also described previously above.

For instance, the edge compute unit 430 can use one or more of the trained AI/ML models 435-1, . . . , 435-N to perform edge inferencing based on input data comprising the locally/edge-generated sensor data streams obtained from the edge assets 410 provided at the same edge environment 402 as the edge compute unit 430. In some aspects, the input data set for edge inferencing performed by edge compute unit 430 can comprise the real-time data feed from edge assets/sensors 410, which can be between tens of Mbps to 10s of Gbps (or greater). The edge compute unit 430 can, in at least some embodiments, include 10s of GPUs for performing local inferencing using the trained AI/ML models 435-1, . . . , 435-N. By performing local inferencing at edge compute unit 430, an inference response time or latency on the order of milliseconds (ms) can be achieved, significantly outperforming the inference response time or latency achievable using cloud-based or on-premises remote inferencing solutions.

In some aspects, the systems and techniques can be configured to implement a continuous feedback loop between edge compute unit(s) 430 and AI/ML training clusters in the cloud user environments 470. For instance, the continuous feedback loop can be implemented based on using the edge compute unit(s) and associated edge assets/sensors 410 to capture data locally, perform inference locally, and respond (e.g., based on the inference) locally. The edge compute unit(s) 430 can be additionally used to compress and transmit features generated during inference from the source data and/or to compress and transmit inference results efficiently to the AI/ML training clusters in the cloud user environments 470 (among other cloud or on-premises locations). In the continuous feedback loop, training and fine-tuning can subsequently be performed in the cloud, for instance by AI/ML training clusters and using the batch uploaded sensor data and/or features uploaded by the edge compute unit(s) 430 to AI/ML training clusters. Based on the training and fine-tuning performed in the cloud by the AI/ML training clusters, new or updated AI/ML models are distributed from the AI/ML training clusters back to the edge (e.g., to the edge compute unit(s) 430 and local site(s) 402). This continuous feedback loop for training and fine-tuning of AI/ML models can be seen to optimize the usage of cloud, edge, and bandwidth resources. The same AI/ML model may be finetuned across multiple edge nodes to optimize the usage of available compute at the nodes and the cloud. For instance, an AI/ML model can be finetuned across a set of edge nodes comprising at least the edge compute unit 430 and one or more edge compute units included in the additional local edge sites 402-N. In some cases, the distributed finetuning of an AI/ML model across multiple edge nodes can be mediated, supervised, and/or controlled, etc., by the AI/ML training clusters implemented within the cloud user environment 470 (e.g., or various other cloud entities). In some examples, the distributed finetuning of an AI/ML model across multiple edge nodes can be supervised and/or controlled, etc., by a selected one or more edge nodes of the set of edge nodes associated with the distributed finetuning of the model. In one illustrative example, distributed finetuning or retraining of an AI/ML model across multiple edge nodes can be orchestrated by a respective fleet management client that is implemented at or by each of the multiple edge nodes.

FIG. 5 is a diagram illustrating an example software stack 500 associated with implementing an edge computing system for ML and/or AI workloads, in accordance with some examples. In particular, FIG. 5 depicts an example platform software stack 502 that can be used to provide single pane management of a fleet of deployed edge compute units, connected sensors and assets associated with an edge compute unit, and/or one or more AI/ML models that are pre-trained and deployed on an edge compute unit to process or otherwise analyze raw sensor data generated by the connected sensors and assets associated with the edge compute unit. As illustrated, the example platform software stack 502 can include domain-specific application services 560, such as the example computer vision services 562, the natural language services 563, the industrial internet of things (IIoT) services 564, the augmented and mixed reality services 565, the reinforcement learning services 566, the robotic platform services 567, and/or the localization, mapping, and navigation services 568, etc., that are depicted as specific examples of domain-specific application services. The example platform software stack 502 can additionally include a qualified application repository 550, which can be implemented as a repository of pre-trained and/or pre-configured AI and/or ML applications capable of running on the edge compute unit to perform specific tasks or computations using specific types of sensors and/or sensor data streams available to or otherwise associated with the edge computing device. In some aspects, the qualified application repository 550 can be implemented as an application marketplace for third-party AI and/or ML applications that can be deployed to the edge compute unit for providing particular or desired computational capabilities and workflows. In comparison to the domain-specific application services 560, it is contemplated that in at least some embodiments, the domain-specific application services 560 can be provided as first-party or platform-level AI and/or ML applications and associated services, while the qualified application repository 550 can be used to provide third-party or developer-level AI and/or ML applications and associated services for implementation on the edge compute unit.

In some aspects, the platform software stack 502 can further include native or platform applications 540. In some embodiments, the application repository 550 can be a cloud-based repository of qualified AI/ML applications for deployment on one or more edge compute units 430. For instance, the application repository 550 can be a cloud-based marketplace for the management of customer and platform ML/AI applications. In some cases, customer applications can be third-party/developer applications, and the platform applications may be the same as or similar to the native/platform applications 540 and/or the domain-specific application services 560.

The native/platform applications 540 can be differentiated from the domain-specific application services 560 on the basis that the native/platform applications 540 are provided in a manner the same as or similar to the third-party or developer level AI/ML applications 550, in that both the native/platform applications 540 and third-party AI/ML applications 550 can be configured to perform a specific sensor data processing or analysis task that may make use of or call one or more of the domain-specific application services 560. In other words, the domain-specific application services 560 can be implemented as modules, engines, APIs, etc., that are configured to perform specific tasks in a generic manner that is independent of the specific implementation or intended use case of one of the native/platform applications 540 or third-party/developer applications 560. For instance, FIG. 5 depicts the example domain-specific application services 560 in the form of computer vision services 562 and IIOT services 564. Various additional domain-specific application services 560 can be implemented or provided without departing from the scope of the present disclosure.

A similar structure can be utilized for implementing the third-party/developer applications 550 to make use of the various domain-specific application services 560. In some aspects, a same or similar functionality can be provided by the third-party/developer applications 550 and the native/platform applications 540. In other examples, one or more functionalities and/or domain-specific application services 560 may be configured for use exclusively by one or more of the native/platform applications 540 (e.g., without the possibility of overlapping, same, or similar functionality by one of the third-party/developer applications 550). In some cases, the native/platform applications 540 can be implemented as Docker or Kubernetes Container environments that are deployable on or to the edge compute units. In some aspects, native/platform applications 540 may be made available and/or distributed using the same marketplace mechanism associated with distributing the third-party/developer applications (e.g., the qualified application repository 550 may, in some embodiments, include both first-party platform/native applications 540 and third-party/developer applications). In other examples, native/platform applications 540 may be pre-loaded or pre-configured on the edge compute unit(s) at the time of deployment, with only the third-party/developer applications 550 being configurable or loadable to the edge compute unit at a later time (e.g., via selection in the qualified application repository 550).

In some embodiments, the platform software stack 502 can additionally include one or more knowledge bases and/or local data storages 545, which may be associated with and utilized by one or more of the third-party AI/ML applications 550 and/or one or more of the native platform applications 540. For instance, some applications may require knowledge bases and databases 545 to be hosted locally for use by the applications. The knowledge bases and databases 545 can be used to store information corresponding to a particular task or analytical/data processing operation implemented by an application that uses the knowledge bases and databases 545. In some cases, the knowledge bases and databases 545 can be logically delineated or separated on the basis of the corresponding application(s) that make use of each of the knowledge bases and databases 545. In some cases, the knowledge bases and databases 545 can be combined for different applications. In some embodiments, the knowledge bases and databases 545 can be included in and/or otherwise associated with the local database 436 of FIG. 4. In some aspects, one or more of the knowledge bases and databases 545 can be implemented locally at the edge (e.g., at local edge site 402 of FIG. 4), can be implemented in the cloud (e.g., a cloud associated with AI/ML training clusters 470 of FIG. 4), and/or can be implemented as a combination of edge and cloud resources.

The knowledge bases and databases 545 may also be referred to herein as a "local datastore/knowledge base" and/or a "local datastore and knowledge base." In some aspects, the local datastore and knowledge base can include content and information obtained over a data network such as the internet. For instance, local datastore and knowledge base content and information can be populated, updated, delivered, etc., via the internet backhaul link 440 shown in FIG. 4 between the local edge site 402 and the cloud cluster(s) 470. In some embodiments, local datastore and knowledge base 545 can be served over a satellite internet constellation-based CDN. In some embodiments, local datastore and knowledge base(s) 545 can be implemented at the edge compute unit 430 of FIG. 4, as noted above. It is further noted that the local datastore and knowledge base(s) 545 can be implemented based on or corresponding to a respective edge compute unit service (e.g., a corresponding edge service for local datastore and knowledge base(s) 545 can be included in the edge compute unit services 605 of FIG. 6, described subsequently below).

In one illustrative example, the local datastore and knowl- edge base(s) 545 can include publicly available data network content (e.g., web content). Notably, the local datastore and knowledge base(s) 545 can further include domain or niche knowledge of processes, devices, assets, personnel, tasks, tools, activities, etc., that are pertinent to the local and global operations of a user (e.g., enterprise user) of the edge compute unit and associated platform system(s) of the present disclosure. In some aspects, this domain or niche knowledge represented within the local datastore and knowl- edge base(s) 545 can be broadly referred to as domain- specific information, task-specific information, operations-specific information, private, proprietary, or non-public information, etc. For instance, the local datastore and knowl- edge base(s) 545 can include domain or operations-specific data generated at the edge and ingested to one or more edge compute units 430 within the fleet of edge compute units of an enterprise user. This local domain or operation-specific edge-generated information may include, but is not limited to, information such as maintenance records, user reports, machine reports and logs, work summaries, activity reports, device/asset manuals, sensor specifications, etc.—some (or all) of which may be consumed at the edge by one or more AI/ML models. For instance, information and data from local datastore and knowledge base(s) 545 can be consumed at the edge during inference using one or more trained AI/ML models, during retraining of one or more pre-trained AI/ML models, and/or during finetuning of one or more pre-trained AI/ML models.

In some aspects, the platform software stack 502 can further include a telemetry and monitoring engine 530 (also referred to herein as the "observer" or "observer engine"), a remote fleet management control plane 520, and a secure edge operating system (OS) 510. In some examples, one or more of the components of platform software stack 502 can be implemented in the cloud (e.g., remote from the edge, such as remote from the local site 402 and/or edge compute unit 430 of FIG. 4). Components of platform software stack 502 that are implemented in the cloud may be implemented with and/or collocated with the AI/ML training clusters 470 of FIG. 4, or may be separate from the AI/ML training clusters 470 of FIG. 4. In some cases, one or more of the components of platform software stack 502 can be imple- mented at the edge, for instance at local site 402 and/or on edge compute unit 430 of FIG. 4.

In one illustrative example, the domain-specific applica- tion services 560 can be implemented in the cloud, can be implemented at the edge, or can be implemented using a combination of cloud and edge deployments. For instance, domain-specific application services 560 may be provided locally on edge compute unit 430 of FIG. 4, particularly for instances where a given domain-specific application service 560 is used often by the edge compute unit 430 (e.g., is called or used by an application or AI/ML model running on the edge compute unit 430 of FIG. 4, such as a third-party/ developer application from repository 550 and/or a native/ platform application 540). In some examples, domain-spe- cific application services 560 may be provided as cloud services that are reached from edge compute unit 430 via internet backhaul link 440. For instance, domain-specific application services 560 that are rarely or not yet used by edge compute unit 430 can remain as cloud services until a greater need emerges at some point in the future for the domain-specific application service 560 to be implemented locally at edge compute unit 430.

In some embodiments, the qualified application repository 550 (e.g., implemented as a marketplace of third-party AI/ML applications for edge compute unit 430) can reside in the cloud, with individual ones of the available AI/ML applications installed to edge compute units 430 based on an enterprise user selection of the AI/ML applications from the cloud-hosted qualified application repository 550. Similarly, native/platform applications 540 may reside in the cloud prior to installation on the edge compute unit 430. In some embodiments, some (or all) of the native/platform applica- tions 540 can be pre-installed or pre-configured locally on the edge compute units, and may optionally be made also available in the cloud.

The observer engine 530 (e.g., telemetry and monitoring engine 530) can be implemented at the edge (e.g., on edge compute units 430) and/or can be implemented in the cloud. For instance, each edge compute unit 430 can run an instance of the observer engine 530 (or a portion thereof) locally, to capture telemetry and other critical environmental monitoring and observation data at the edge compute unit 430 and/or local site 402 associated with the edge compute unit 430. The telemetry and monitoring data from the local instance of observer engine 530 at each edge compute unit 430 can be transmitted to a corresponding observer engine instance 530 running in the cloud.

For example, the local observer engine 530 instance at edge compute unit 430 can upload host and satellite con- stellation level metrics to a global observer engine instance that is associated with the cloud-based remote fleet man- agement control plane 520. The cloud-based remote fleet management control plane 520 can be used to provide a single pane of glass interface to the fleet of edge compute units 420 and local sites 402 (e.g., 402, . . . , 402-N), and can display the observer engine telemetry and monitoring data from various edge compute units 430 using a global man- agement console (also referred to herein as a global man- agement portal). For instance, the remote fleet management control plane 520 can include or provide one or more graphical user interfaces (GUIs) indicative of various telem- etry and monitoring data obtained from the deployed edge compute units 430 and local sites 402.

The secure edge OS 510 can be installed on the edge compute units 430, and may be used to provide operating system functionality for implementing computation opera- tions and other functionalities at the edge compute unit 430 itself. The secure edge OS 510 can additionally be used to provide an interface and communications between the edge compute unit 430 and the remaining portions of the platform software stack 502. For instance, the secure edge OS 510 can be configured to communicate with the cloud-based com- ponents of the platform software stack 502, including observer engine 530, remote fleet management control plane 520, domain-specific application services 560, qualified application repository 550, and/or platform applications 540.

Figure 6:
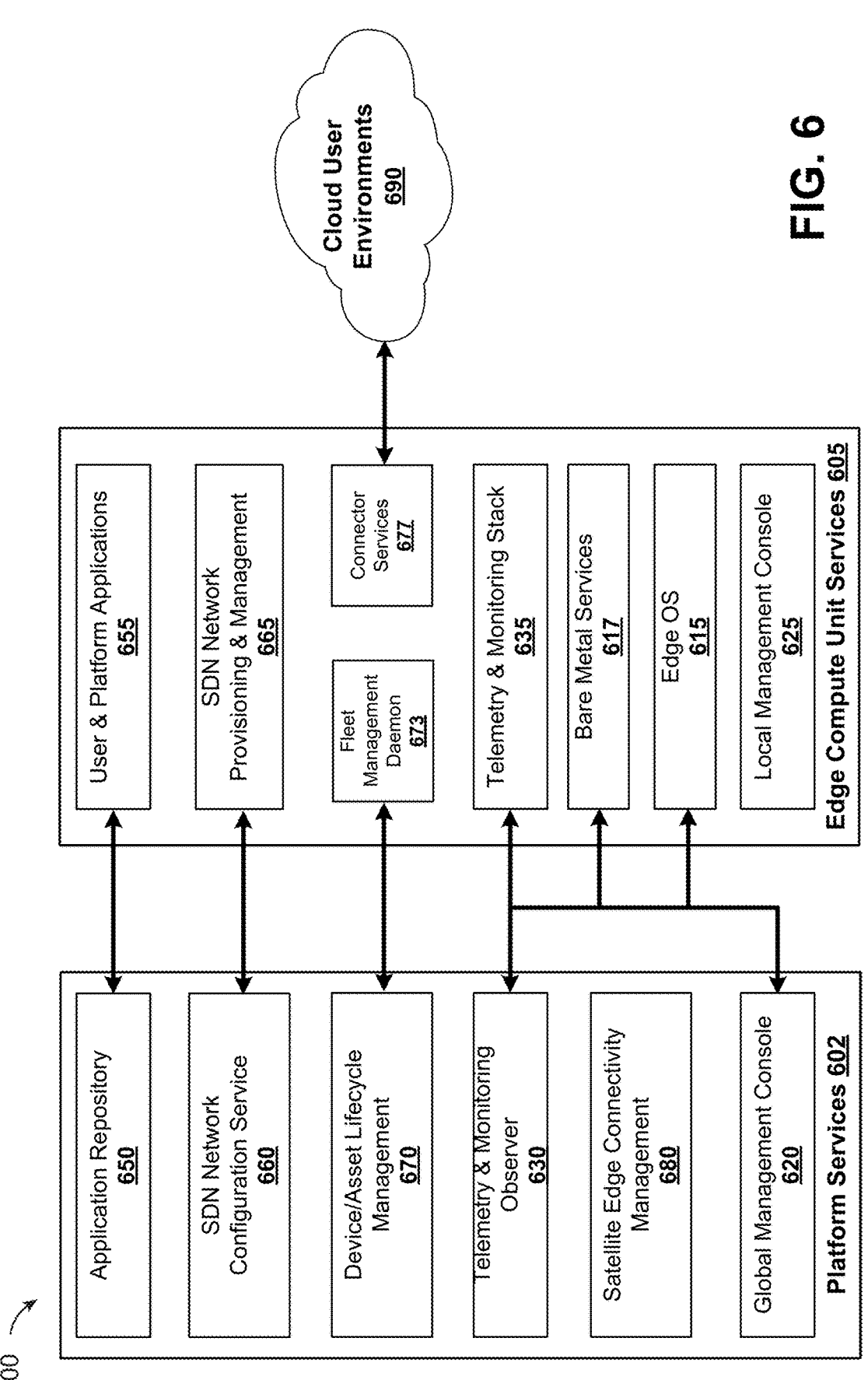
FIG. 6 is a diagram illustrating an example architecture for implementing global services and edge compute services of an edge computing system for ML and/or AI workloads, in accordance with some examples.

FIG. 6 is a diagram illustrating an example architecture 600 for implementing platform (e.g., global) services 602 and edge compute services 605 of an edge computing system for ML and/or AI workloads, in accordance with some examples. In some embodiments, the platform services 602 of FIG. 6 can be the same as or similar to the platform software stack 502 of FIG. 5. With respect to the edge compute unit services 605 of FIG. 6, as illustrated the edge compute unit services 605 can include user and platform applications 655, SDN network provisioning and management engine 665, a fleet management daemon 673, cloud connector services 677, a telemetry and monitoring stack 635, bare metal services 617, an edge OS 615, and a local management console 625. In some aspects, the user and platform applications 655 can be the same as or similar to (and/or can include) the trained AI/ML model inference instances 435-1, . . . , 435-N depicted in and described above with respect to the edge compute unit 430 of FIG. 4.

In some embodiments, the edge compute unit services 605 can include one or more edge services associated with implementing, maintaining, updating, using, etc., local datastore and knowledge base information at and for an edge compute unit. For instance, the edge compute unit services 605 can include one or more edge services associated with implementing, maintaining, updating, using, etc., the local datastore and knowledge base(s) 545 depicted in FIG. 5 and described previously above. In some embodiments, one or more of the edge connector services 677 can be associated with implementing the local datastore and knowledge base(s) 545 of FIG. 5. In some aspects, one or more dedicated edge connector services (not shown) within the edge compute unit services 605 can be associated with implementing the local datastore and knowledge base(s) 545 of FIG. 5.

In one illustrative example, the global management console 620 can provide users with single pane of glass access, insight, and/or management corresponding to each of the remaining modules of the platform services 602 and/or of the edge compute unit services 605. For instance, the global management console 620 can provide one or more GUIs corresponding to each of the platform services 602. For instance, the global management console 620 can be a cloud-hosted global management console configured to implement a comprehensive asset management portal.

As contemplated herein, the global management console 620 can provide a comprehensive and unified software solution designed to simplify and streamline the management of an enterprise customer's fleet of edge-deployed assets, including edge compute units 430 and/or other connected sensors and edge assets 410 deployed at a local edge site 402 in conjunction with one or more edge compute units 430. In one illustrative example, global management console 620 can be configured to provide a single intuitive interface with one or more GUIs corresponding to each of the platform services 602 and/or corresponding to one or more of the edge compute unit services 605. Using the global management console 620 and its corresponding GUIs, the systems and techniques described herein can be used to implement complete and superior remote visibility and control over all aspects of edge asset and edge compute device 430 operations.

For instance, the global management console 620 can be used to provide physical asset management with full oversight of the location, power, storage, data, and connectivity associated with a fleet of edge compute devices 430 and connected edge assets 410 of a local edge site 402. The physical asset management provided by global management console 620 can be used to achieve optimal resource allocation and performance at the edge. The platform services 602 can be used to monitor real-time energy consumption, data usage, utilized storage, and/or network connectivity (among various other parameters and data streams) to minimize downtime and maximize efficiency at the edge.

In some aspects, the global management console 620 can provide physical asset management that includes visibility and insight into "App Metrics". The "App Metrics" can correspond to monitoring information for AI/MK workloads implemented at the edge, such as on an edge compute device 430. For instance, the "App Metrics" may correspond to one or more (or all) of the AI/ML inference workloads 435-1, . . . , 435-N depicted running on the edge compute unit 430 of FIG. 4. In some aspects, the global management console 620 can be used to provide application management for deployed AI/ML applications running on the edge compute unit 430. For instance, global management console 620 can provide application management for the deployed user and platform AI/ML applications 655 included in the edge compute unit services 605 running on edge compute unit 430. In some aspects, global management console 620 can provide application management for deployed AI/ML applications to simplify the deployment and management of the AI/ML applications with asset-aware resource provisioning. In such examples, enterprise users of the global management console 620 can easily deploy, update, and remove AI/ML applications on multiple assets (e.g., multiple edge compute units 430) at once. In some embodiments, application management via global management console 620 can be combined with or implemented in conjunction with the cloud-based application repository 650 that is used to install and manage some (or all) of the user and platform AI/ML applications 655 on the edge compute unit 430.

In some embodiments, the global management console 620 can be used to provide workload management for the deployed AI/ML applications running on the edge compute unit 430. For instance, global management console 620 can provide workload management for some (or all) of the deployed user and platform AI/ML applications 655 of FIG. 6, for some (or all) of the deployed AI/ML model inference instances 435-1, . . . , 435-N running on the edge compute unit 430 of FIG. 4, etc. In some cases, workload management can be implemented based on using the global management console 620 to manage AI/ML workloads deployed to one or more edge assets of an enterprise user (e.g., deployed to one or more edge compute units 430/local sites 402 of the enterprise user).

Workload management for AI/ML workloads can include, but is not limited to, automatic resource provisioning, sensor suite selection, job assignment, job cancellation features, etc. In some aspects, enterprise users of the global management console 620/platform services 602 can see which assets (e.g., edge compute units 430, or assets/compute components thereof) are currently available and capable of performing an AI/ML workload either now or at a scheduled time in the future. In some embodiments, workload management for AI/ML workloads on an edge compute device 430 can include scheduling the AI/ML workload for a future time when bandwidth, data, computation, and/or energy is projected or estimated to be more available, is projected or estimated to be cheaper, etc.

As illustrated in FIG. 6, the application repository 650 of platform services 602 can correspond to the user and platform applications 655 of the edge compute unit services 605. For instance, the user and platform applications 655 can comprise a selection or a subset of the complete listing of applications available in application repository 650, where the selection or subset of the AI/ML applications represents those AI/ML applications that an enterprise user has selected for installation or deployment on the edge compute unit 430. Installing or deploying an AI/ML application on the edge compute unit 430 can be based on including the AI/ML application in the user and platform applications 655 of the edge compute unit services 605. Installing or deploying an AI/ML application on the edge compute unit 430 may additionally include configuring or providing on the edge compute unit 430 (or at local edge site 402) one or more corresponding sensors, devices, and/or robotic assets, etc., associated with, used by, or required for the particular AI/ML application.

In some aspects, the edge compute unit services 605 can be connected to various sensors, external devices (e.g., displays, handhelds, personal devices, etc.), robotic assets, etc., that are provided or deployed at the edge (e.g., deployed in association with one or more edge compute units 430). For example, one or more edge services of the edge compute unit services 605 can be used to configure and manage connectivity to the sensors, external devices, robotic assets, etc., at the edge. In some examples, one or more edge services of the edge compute unit services 605 can be used to configure and manage the local network 420 connectivity shown in FIG. 4 between the edge compute unit 430 and the autonomous robotic assets 416, local site cameras 414, environmental sensors 412, etc. More generally, in some examples, the one or more edge services of the edge compute unit services 605 can be used to configure and manage connectivity to the edge assets 410 across one or more local edge sites 402 (e.g., including additional local site(s) 402-N) and/or across one or more edge compute units 430.

In one illustrative example, the platform applications represented in the software stack (e.g., included in the user and platform applications 655 deployed at the edge, included in the application repository 650 in the cloud, etc.) can be used to enable enterprise user's AI/ML workloads to be run on the edge compute units 430. For instance, the platform AI/ML applications can be based on a core orchestration layer of platform services 602/edge compute unit services 605 to account for redundancy and resiliency. In some embodiments, the platform AI/ML applications can utilize or be based on open-source distributed computing platforms for data processing, storage, and movement (e.g., Spark, MinIO, Kafka, etc.). In some aspects, the platform AI/ML applications can be fully managed applications, for instance in terms of tuning, updates, addressing of critical vulnerabilities, etc.

In some embodiments, the application repository 650 can include first-party/platform AI/ML applications and can include third-party/developer AI/ML applications. In some examples, first-party/platform AI/ML applications can be configured as a core suite of AI and ML applications, models, networks, etc., that are trained and selected to solve or otherwise address various unsolved and/or underserved enterprise user use cases in the edge computing space. In one illustrative example, the first-party/platform AI/ML applications can be deployed and managed through a cloud-based application marketplace (e.g., application repository 650). The first-party/platform AI/ML applications can be tuned and right-sized (e.g., scaled up or down, compressed, optimized, etc.) for the various hardware configurations available for the edge compute units 430, and can be designed or purpose-built to maximize resource utilize at the edge and when deployed on the edge compute units 430. For instance, the edge compute unit 430 can be associated with a plurality of pre-configured compute hardware options. Some (or all) of the first-party/platform AI/ML applications can be provided to the cloud-based application repository in a form or version optimally corresponding to various ones of the plurality of pre-configured compute hardware options available for implementing the edge compute unit. For instance, a first compute hardware configuration of the edge compute unit 430 may be more powerful (e.g., more GPUs, more powerful GPUs, more RAM, etc.) than a second compute hardware configuration of the edge compute unit 430 (e.g., fewer GPUs, less powerful GPUs, fewer available GPU cores, lower GPU data transfer speed, less RAM, etc.). Some (or all) of the pre-trained and pre-tuned first-party/platform AI/ML applications can have at least a first version optimized to run on the first compute hardware configuration of the edge compute unit 430 and a second (smaller and more lightweight) version optimized to run on the second compute hardware configuration of the edge compute unit 430, etc.

In some cases, application repository 650 can be implemented as a cloud-based marketplace for the management of customer and platform AI/ML applications (e.g., including the deployed user and platform applications 655 provided in the edge compute unit services 605). For instance, the application repository 650 (e.g., AI/ML application marketplace) can be used to provide fully managed applications that are subjected to a qualification and certification process prior to being on-boarded to the cloud-based application repository/marketplace 650 for deployment to various enterprise user local edge sites 402 and corresponding edge compute units 430. In some cases, the qualification and certification process for onboarding a third-party/developer ML/AI application to the marketplace can be performed to determine runtime fidelity and viability of the third-party ML/AI application for deployment on the edge compute units 430. In some embodiments, the application repository/marketplace 650 can be configured to provide one-click deployment and observability for the application lifecycle (e.g., from the cloud to the edge compute unit 430, and vice versa), obviating or reducing the need for cost and time intensive application and platform management as would conventionally be required.

In one illustrative example, application repository 650 can be used to deploy workloads into HCI through the global management console 620 (e.g., a corresponding GUI of the global management console 620 for the application repository/marketplace 650). For instance, one or more AI/ML applications can be selected from the application repository 650 (e.g., selected from a plurality of ML or AI applications included in the application repository 650) for installation or deployment onto one or more edge compute units 430, where the selection is made using global management console 620 and/or a GUI thereof. For instance, one or more AI/ML applications can be obtained from the application repository 650 and deployed to one or more edge compute units based on receiving a request indicative of the AI/ML applications that are to be deployed. The request can be received using global management console 620 and/or a GUI thereof. The request can be indicative of a selection of one or more ML applications qualified for deployment on a particular edge compute unit(s) (e.g., one or more ML applications having minimum requirements that are met or exceeded by the particular edge compute unit corresponding to the request).

In some aspects, the platform services 602 can further include an application orchestration engine (not shown) that can be used for the deployment of Kubernetes on the edge compute units 430. For instance, in some embodiments, the application orchestration engine can be used to provide standalone Kubernetes clusters and Tanzu Kubernetes clusters on HCI. In some aspects, the application orchestration engine can be used to provide automated Kubernetes cluster lifecycle management using helm and ArgoCD.

The platform services 602 are depicted in FIG. 6 as further including a device/asset lifecycle management (DLM) engine 670. The DLM engine 670 can be used to perform tasks and operations such as provisioning, adding/removing, and managing connected assets associated with the platform services 602. For instance, the DLM engine 670 can be used to perform asset management relating to the one or more edge compute units 430 provided at the plurality of local sites 402, . . . , 402-N of FIG. 4. Connected assets managed by the DLM engine 670 can additionally include various sensors and other assets, computing devices, etc., provided at the edge and/or otherwise associated with an edge compute unit 430. For instance, the DLM engine 670 can be used to perform asset management relating to the plurality of sensors or sensor packages that are provided at a local site 402 and/or associated with generating input sensor data used by an edge compute unit 430. For instance, the edge assets 410 of FIG. 4 (e.g., autonomous robots 416, local site cameras 414, environmental sensors 412, etc.) can each be managed by the DLM engine 670 of FIG. 6. In some examples, the DLM engine 670 can be a cloud-based component or module of the platform services 602.

In some cases, the DLM engine 670 GUI can display a listing or visual depiction of the various assets that have been deployed, registered, provisioned, etc., for the enterprise user of platform services 602. For instance, the assets managed by DLM engine 670 can be separated, filtered, stored, etc., based on factors such as asset type, asset location, asset age, asset status, asset task or usage, etc. In some embodiments, the functionality of DLM engine 670 can be provided by a DLM asset service and a DLM provisioning service that are both included in DLM engine 670. For instance, the DLM asset service and the DLM provisioning service can be sub-services implemented by DLM engine 670 in the platform services 602. The DLM asset service and DLM provisioning service can both be cloud-based services. In some examples, the DLM asset service is a cloud-based service used to manage the assets (e.g., edge compute units 430, connected sensors, and/or other edge assets 410 provided at a local site 402 edge location, etc.) belonging to an organization. In some examples, the DLM asset service can be a cloud-based service configured to add assets to an organization, remove assets from an organization, list assets, manage additional properties like endpoints, etc.

The DLM provisioning service can be a separate cloud-based service that is used to recognize assets belonging to an organization and register them as such. For instance, when a new edge asset, connected sensor, or edge compute unit, etc. is provided at a local site 402, the new edge asset, connected sensor, or edge compute unit can initially connect to and communicate with the DLM provisioning service of the DLM engine 670 (e.g., via the internet backhaul communication link 440 of FIG. 4). Based on the initial connection between the new edge device and the DLM provisioning service of the DLM engine 670, provisioning can be performed such that the new edge device can be registered to and associated with the enterprise user or organization that operates the local site 402. In some embodiments, the DLM provisioning service can register or provision assets as belonging to an organization based on hardcoding HCI assets as belonging to the particular organization. In some embodiments, the DLM provisioning service can provision assets using certificates (CA), if turned on or enabled at the local customer/enterprise site (e.g., local site 402 of FIG. 4). In some cases, the DLM provisioning service can hardcode satellite internet constellation assets as belonging to the organization. For instance, a satellite internet constellation transceiver coupled to or otherwise in communication with the edge compute unit 430 (e.g., a satellite internet constellation transceiver provided at or near the local site 402) can be hardcoded as belonging to the organization using the DLM provisioning service of the DLM engine 670.

In some embodiments, the DLM engine 670 can further include a DLM cloud control plane service (not shown). The DLM cloud control plane service can be used to implement a cloud component for the control plane responsible for device management. For instance, the DLM cloud control plane service can be used to deploy workloads, grab (e.g., retrieve or obtain) the live state of various HCI hosts (e.g., edge compute units 430 or compute hardware/HCI hosts running thereon). In some embodiments, the DLM cloud control plane service can be used to send curated commands and control indications to an edge compute unit 430, where the commands may be user-initiated, automatically or system initiated, or a combination of the two. For instance, a user input or configuration action provided to a GUI of the global management console 620 corresponding to the DLM engine 670 (or other component of platform services 602) can be automatically translated into control plane signaling by the DLM cloud control plane service, and can be pushed to the appropriate services of the edge compute unit 430 (e.g., translated and pushed from the cloud-based DLM cloud control plane service within platform services 602, to the appropriate or corresponding one(s) of the edge compute unit services 605 running on the edge compute unit 430). In some aspects, the DLM cloud control plane service can be implemented based on a scalable design for control plane and additional management APIs.

In some examples, DLM engine 670 can further include or otherwise be associated with an edge compute unit cloud control plane service (not shown). The edge compute unit cloud control plane service can be implemented at the edge compute unit 430 (e.g., can be included in the edge compute unit services 605) and may provide a resident control plane that provides an interface into a given edge compute unit 430 from the cloud. For instance, the edge compute unit cloud control plane service can provide an interface from the global management console 620 (and/or other platform services 602) into a given edge compute unit 430. The interface into a given edge compute unit 430 can be mediated by the DLM cloud control plane service (on the cloud side) and the edge compute unit cloud control plane service (on the edge side). In some aspects, the edge compute unit cloud control plane service can be used to implement REST endpoints for deploying applications (e.g., the user and platform applications 655, deployed to the edge from the cloud-based application repository 650), servicing curated commands, etc.

In some aspects, the DLM engine 670 of platform services 602 can correspond to or otherwise be associated with an edge-based fleet management daemon 673 that is included in the edge compute unit services 605 and/or deployed on the edge compute unit(s) 430. For instance, the edge-based fleet management daemon 673 can be configured to provide node-level data and metrics (where the node-level corresponds to the level of individual edge compute units 430). More generally, the edge-based fleet management daemon 673 can be configured to perform collection of vital statistics and data related to nodes/edge compute units 430 registered with the platform services 602 and needed for display, management, monitoring, or other interaction through the global management console 620. In some cases, the edge-based fleet management daemon 673 can additionally, or alternatively, be used to implement a coredump collector that is in communication with the cloud-based DLM engine 670.

The platform services 602 can further include the telemetry and monitoring observer engine 630, which can correspond to the telemetry and monitoring stack 635 implemented on the edge compute unit 430 among the edge compute unit services 605. In some aspects, the observer can be used to provide hardware and critical environment observability designed to be part of a comprehensive and unified software solution to simplify and streamline the management of a customer' fleet of edge compute units 430 and associated edge assets 410. For instance, the telemetry and monitoring observer engine 630 and/or the telemetry and monitoring stack 635 can enable system-wide visibility, command, and control of the fleet's hardware systems (e.g., the hardware systems of the edge compute units 430 and/or the hardware systems of the connected edge assets 410). The fleet's hardware systems that may be associated with, viewed, commanded, controlled, etc., by telemetry and monitoring observer engine 630 and/or telemetry and monitoring stack 635 can include, but are not limited to: power distribution systems or sub-systems, thermal management functionality, internal environmental control systems and functionalities, data connectivity (e.g., both backhaul and device), physical security systems (e.g., at local site 402, associated with edge compute unit 430, associated with connected edge assets 410, etc.).

In some aspects, the telemetry and monitoring stack 635 implemented on the edge compute unit 430 (e.g., included in the edge compute unit services 605) can include one or more cloud-based services or sub-services. In some aspects, the telemetry and monitoring stack 635 can comprise a plurality of sub-services each running from the cloud, with telemetry and monitoring stack 635 itself running from edge compute unit 430. In some embodiments, telemetry and monitoring stack 635 can run at the edge and can include cloud-based services or sub-services configured to upload host-level and satellite internet constellation metrics for an observation view of telemetry and monitoring info from cloud-based global management console 620.

For instance, the telemetry and monitoring stack 635 can include a network telemetry and monitoring service that runs in the cloud (e.g., is a cloud-based service) and is configured to provide network usage statistics corresponding to one or more of a local network 420 associated with the edge compute unit 430, SDN networking associated with the edge compute unit 430 (e.g., SDN networking implemented based on the SDN network configuration service 660 and SDN network provisioning and management engine 665), and/or internet backhaul 440 associated with the edge compute unit 430 and cloud user environments 690. In some cases, the cloud-based network telemetry and monitoring service can be included in, associated with, etc., one or more of the cloud-based SDN network configuration service 660 included in the platform services 602 and/or the edge-based SDN network provisioning and management engine 665 included in the edge compute unit services 605 deployed on the edge compute unit 430.

In some embodiments, the telemetry and monitoring stack 635 can include a satellite internet constellation telemetry and monitoring service that runs in the cloud (e.g., is a cloud-based service) and is configured to provide network usage statistics and satellite internet constellation metrics corresponding to connectivity between the local site 402/edge compute unit 430 and one or more bird (e.g., satellites) of the satellite internet constellation. In some aspects, the cloud-based satellite internet constellation telemetry and monitoring service can be included in, associated with, etc., the satellite edge connectivity management engine 680 included in the platform services 602.

In some cases, the telemetry and monitoring stack 635 can further include a critical environment telemetry and monitoring service running locally at the edge (e.g., on the edge compute unit 430/included in the edge compute unit services 605). The critical environment telemetry and monitoring service can display data from one or more APIs associated with or provided with the containerized data center used to implement the edge compute unit 430, and corresponding to telemetry and monitoring information for components within the edge compute unit 430 (e.g., including ambient environmental parameters such as temperature or humidity, power consumption, etc.; including monitoring parameters for various compute hardware included in the HPC engine 434 of edge compute unit 430; etc.). In some aspects, the critical environment telemetry and monitoring service can upload HCI/satellite internet constellation metrics to the cloud (e.g., platform services 602 and/or cloud user environments 690) for display in the global management console 620. In some embodiments, the telemetry and monitoring stack 635 can further include a host level telemetry and monitoring (compute and storage) service running locally at the edge (e.g., on the edge compute unit 430/included in the edge compute unit services 605). The host-level telemetry and monitoring (compute and storage) service can be used to collect and/or display data from local edge hosts (e.g., edge compute units 430) and/or Kubernetes clusters associated with the local edge compute host units 430. The host-level telemetry and monitoring (compute and storage) service can upload HCI level host, virtual machine (VM), and/or Kubernetes data and metrics to the cloud (e.g., platform services 602 and/or cloud user environments 690) for display in the global management console 620.

In some aspects, the telemetry and monitoring stack 635 can further include a network telemetry and monitoring service running locally at the edge (e.g., on the edge compute unit 430/included in the edge compute unit services 605) and configured to provide combined network and satellite internet constellation connectivity metrics, network usage statistics, etc. The network telemetry and monitoring service can upload satellite internet constellation metrics, HCI network utilization metrics, etc., to the cloud (e.g., platform services 602 and/or cloud user environments 690) for display in the global management console 620.

FIG. 7 is a diagram illustrating an example infrastructure and architecture 700 for implementing an edge computing system for ML and/or AI workloads, according to aspects of the present disclosure. For instance, FIG. 7 includes a global management platform 702 that can be a cloud-based platform that can include one or more components that are the same as or similar to corresponding components within the platform services 602 of FIG. 6 and/or within the platform software stack 502 of FIG. 5. FIG. 7 additionally includes a plurality of edge compute units 704 (e.g., a fleet of edge compute units 704), each of which may be the same as or similar to the edge compute unit 430 of FIG. 4 and/or can include one or more components that are the same as or similar to corresponding components within the edge compute unit services 605 of FIG. 6. In particular, each edge compute unit 704 of the plurality of edge compute units can implement, include, or comprise an edge compute unit host 705, which can be the same as or similar to the edge compute unit services 605 of FIG. 6.

For instance, a global management platform 702 can include the application repository 650 and global management console 620 of FIG. 6, in addition to the remote fleet management control plane 520 of FIG. 5. The global management platform 702 can be a cloud-hosted and/or on-premises computing system that is remote from the respective local edge sites associated with various edge compute units 704 of the fleet (e.g., plurality) of edge compute units 704. For instance, global management platform 702 of FIG. 7 can be associated with one or more of cloud-based AI/ML training clusters 470 of FIG. 4, the cloud user environments 690 of FIG. 6, etc.

The remote fleet management control plane 520 can include an organization and onboarding service 722 that can be used to perform organization-specific tasks corresponding to an enterprise organization (e.g., enterprise user) of the global management platform 702 and/or the infrastructure and architecture 700 for edge computing of ML and AI workloads. For example, the onboarding service 722 can be used to onboard users for the enterprise organization, based on creating one or more user accounts for the global management console 602 and/or the local management console 625 of FIG. 7. The remote fleet management control plane 520 can additionally include a provisioning service 724 that can be used to provision various edge assets associated with (e.g., deployed by) the enterprise user. For instance, the provisioning service 724 can be associated with provisioning satellite internet constellation transceivers or connectivity units for the edge compute units 704, can be associated with provisioning the edge compute units 704, can be associated with provisioning one or more user devices (e.g., such as the user device 795), can be associated with provisioning one or more connected edge assets 710-1, . . . , 710-N (e.g., which can be the same as or similar to the connected edge assets 410 of FIG. 4), etc.

The remote fleet management control plane can include and/or can be associated with one or more databases, such as a fleet datastore 747 and a metrics datastore 749. In some aspects, the fleet datastore 747 can store data or information associated with the fleet of deployed edge compute units 704. For instance, fleet datastore 747 can communicate with one or more (or all) of the organization and onboarding service 722, the provisioning service 724, the device lifecycle management service 670, etc. In some aspects, the fleet datastore 747 and/or the metrics datastore 749 can communicate with and be accessed by the global management console 620. For instance, global management console 620 can access and communicate with the metrics datastore 749 for metrics visualization corresponding to one or more of the deployed edge compute units 704 of the fleet (e.g., plurality) of deployed edge compute units 704. In some embodiments, the fleet datastore 747 can include the local knowledge base/datastore 545 of FIG. 5, described previously above.

As mentioned previously, the global management platform 702 can be associated with and used to manage the deployment of a fleet of edge compute units 704. The various edge compute units 704 can be deployed to different edge locations. For instance, one or more edge compute units 704 can be deployed to each respective edge location that is associated with (e.g., is managed by and communicates with) the global management platform 702. As illustrated in the example of FIG. 7, a first edge location may have four edge compute units deployed (e.g., left-most deployment shown in FIG. 7), a second edge location may have two edge compute units deployed (e.g., center deployment shown in FIG. 7), a third edge location may have three edge compute units deployed (e.g., right-most deployment shown in FIG. 7), etc. A greater or lesser number of edge site locations can be utilized, each with a greater or lesser number of edge compute units 704, without departing from the scope of the present disclosure.

Each edge compute unit can be associated with an edge compute unit host 705, which is shown in the illustrative example of FIG. 7 as corresponding to a single one of the plurality of edge compute units 704. In particular, each edge compute unit 704 of the plurality of edge compute units can implement, include, or comprise an edge compute unit host 705, which can be the same as or similar to the edge compute unit services 605 of FIG. 6, and/or can include or implement one or more of the components of edge compute unit 430 of FIG. 4, etc. The edge compute unit host 705 can include the local management console 625 of FIG. 6, which may be associated with a metrics datastore 742. The metrics datastore 742 can be used to collect and store local telemetry and other metrics information generated and/or received at the edge compute unit host 705 and/or corresponding local edge site of the edge compute unit host 705. In some aspects, information included in the local metrics datastore 742 can be the same as or similar to at least a portion of the information included in the global management platform 702 metrics datastore 749. In some cases, information included in the local metrics datastore 742 can be separate or disjoint from at least a portion of the information included in the global management platform 702 metrics datastore 749.

In some examples, the local management console 625 can be communicatively coupled with the local metrics datastore 742, and can be configured to provide metrics readout information and/or visualization to one or more user devices 795 that are local to the same edge location as the edge compute unit host 705 and that are authorized to access and interface with the local management console 625 (e.g., access control and authorization may be implemented based on the organization and onboarding service 722 of the global management platform 702). The user devices 795 can include various computing devices, including but not limited to, desktop computers, laptop computers, tablet computers, smartphones, wearable computing devices, output devices or equipment, display devices or equipment, personal computing devices, mobile computing devices, portable hand units or terminals, display monitors, etc.) that may be present within or otherwise associated with the local edge site of the edge compute unit host 705.

The local management console 625 can additionally communicate with an edge observer engine 760, which can correspond to the telemetry and monitoring stack 635 of the edge compute unit services 605 of FIG. 6. In some embodiments, the edge observer engine 760 can be the same as or similar to the telemetry and monitoring stack 635 of FIG. 6. The edge observer engine 760 can include a host-level telemetry service 737 and a critical environment monitoring service 739 (one or more, or both, of which can be included in the telemetry and monitoring stack 635 of FIG. 6). The critical environment monitoring service 739 can be used to monitor environmental parameters of the edge compute unit 704/edge compute unit host 705, such as temperature, humidity, airflow, vibrations, energy consumption, etc. The critical environment monitoring service 739 can ingest, obtain, or otherwise access corresponding sensor data or sensor data streams from environmental monitoring sensors, which can include one or more (or all) of the environmental sensors 412 of FIG. 4. In some aspects, the edge observer engine 760 can additionally include an application deployer 757, which can communicate with the cloud-based application repository 650 of the global management platform 702 (e.g., the cloud-based application repository 650 of FIG. 6). In some embodiments, log data from the edge observer engine 760 can be transmitted (e.g., as a log stream) from the edge observer engine 760 to a log archival agent 775 of a fleet management client 770 included in the edge compute unit host 705. The log archival agent 775 can, in some aspects, parse and/or archive (e.g., store or transmit for storage) some or all of the log stream data received from and/or generated by the edge observer engine 760. For instance, the log archival agent 775 of the fleet management client 770 can transmit the log stream data received from and/or generated by edge observer engine 760 to the cloud-based metrics datastore 749 of the global management platform 702, where the transmitted log stream data from the cloud-based metrics datastore 749 can be used for metrics visualization at or using the global management console 620 (also of the global management platform 702).

In some aspects, the fleet management client 770 included in or deployed on the edge compute unit host 705 can be associated with the fleet of deployed edge compute units 704. For instance, the fleet management client 770 can associate the particular edge compute unit host 705 with the corresponding additional edge compute unit hosts 705 that are also included in the same fleet. In some aspects, the fleet management client 770 can be used to coordinate and implement distributed operations (e.g., computational operations, such as finetuning, retraining, etc., of one or more AI/ML models) across multiple edge compute units 704 of the fleet. For instance, in one illustrative example, distributed finetuning or retraining of an AI/ML model across multiple edge compute units 704 be orchestrated by a respective fleet management client 770 that is implemented at or by each of the multiple edge compute units 704. As illustrated, the fleet management client 770 can include the fleet management daemon 673 described above with respect to FIG. 6. The fleet management daemon 673 of the fleet management client 770 provided on each edge compute unit host 705 can communicate with the device lifecycle management service 670 of the remote fleet management control plane 520 implemented in the global management platform 702. In some aspects, the fleet management daemon 673 of the fleet management client 770 provided on each edge compute unit host 705 can communicate with the remote fleet management control plane 520, the global management console 620, and/or various other component and services within the global management platform 702 of FIG. 7.

In some aspects, the edge compute unit host 705 can communicate with a plurality of connected edge assets 710-1, . . . , 710-N. As noted previously, the connected edge assets 710-1, . . . , 710-N can be the same as or similar to the connected edge assets 410 of FIG. 4, and can include various sensors, computing devices, etc., that are associated with an edge deployment location of the edge compute unit host 705. For instance, the connected edge assets 710-1, . . . , 710-N in communication with the edge compute unit host 705 can include, but are not limited to, one or more of sensors such as cameras, thermal imagers, lidars, radars, gyroscopes, accelerometers, vibrometers, acoustic sensors or acoustic sensor arrays, sonar sensors or sonar sensor arrays, pressure sensors, temperature sensors, X-ray units, magnetic resonance imaging (MRI) units, electroencephalogram (EEG) units, electrocardiogram (ECG) units, inertial navigation system (INS) units, inertial measurement units (IMUs), GPS modules, positioning system modules, compass sensors, directional sensors, magnetic field sensors, robotic platforms, robotic units, robotic devices, etc., among various others. In some aspects, the connected edge assets 710-1, . . . , 710-N associated with the edge compute unit host 705 can include all devices connected to edge compute units that have local ingress and egress of data.

Network Management and Multi-WAN Routing at the Edge

Systems and techniques are described herein that can be used to implement network management and control with containerized router applications and multiple communication network modalities at the edge. For instance, the systems and techniques described herein can be used to provide multi-WAN routing and/or network management at the edge, including for edge deployments and/or edge compute units such as those variously described above with respect to FIGS. 1-7. Reference is made to an example edge deployment associated with one or more of the edge compute units (e.g., also referred to as edge data centers, containerized edge compute units, containerized edge data centers, etc.) described previously above for purposes of illustration and example, although it is noted that such reference is made for purposes of clarity of explanation and example and is not intended to be construed as limiting. For instance, it is also contemplated that the systems and techniques described herein (and described more specifically, described below with reference to FIG. 8) can be applied to any suitable edge deployment of one or more edge devices connected to a local edge network and configured with a multi-WAN router capable of communicating using two or more WANs of different communication modalities.

In at least one illustrative example, a multi-WAN routing and/or multi-WAN router device(s) can be configured to provide backhaul (e.g., backhaul internet) connectivity to an edge device and/or an edge deployment location that also utilizes a satellite internet constellation connectivity. The backhaul connectivity can comprise a first WAN associated with a first communication modality, and the satellite internet constellation connectivity can comprise a second WAN associated with a second communication modality, where the first WAN is different from the second WAN, and where the first communication modality is different from the second communication modality.

In some examples, the systems and techniques described herein can provide multi-WAN internet backhaul communications to an edge device that also communicates using a satellite internet constellation that is the same as or similar to one or more of the satellite internet constellations described previously with respect to FIG. 2A and/or FIG. 2B. In some embodiments, the multi-WAN systems and techniques described herein can be associated with implementing multi-WAN internet backhaul that is associated with (e.g., included in, the same as, similar to, etc.) the internet backhaul link 440 to the edge compute unit 430/local edge site 402 of FIG. 4.

Further details and aspects of the present disclosure will be described below with respect to the figures.

Figure 8:
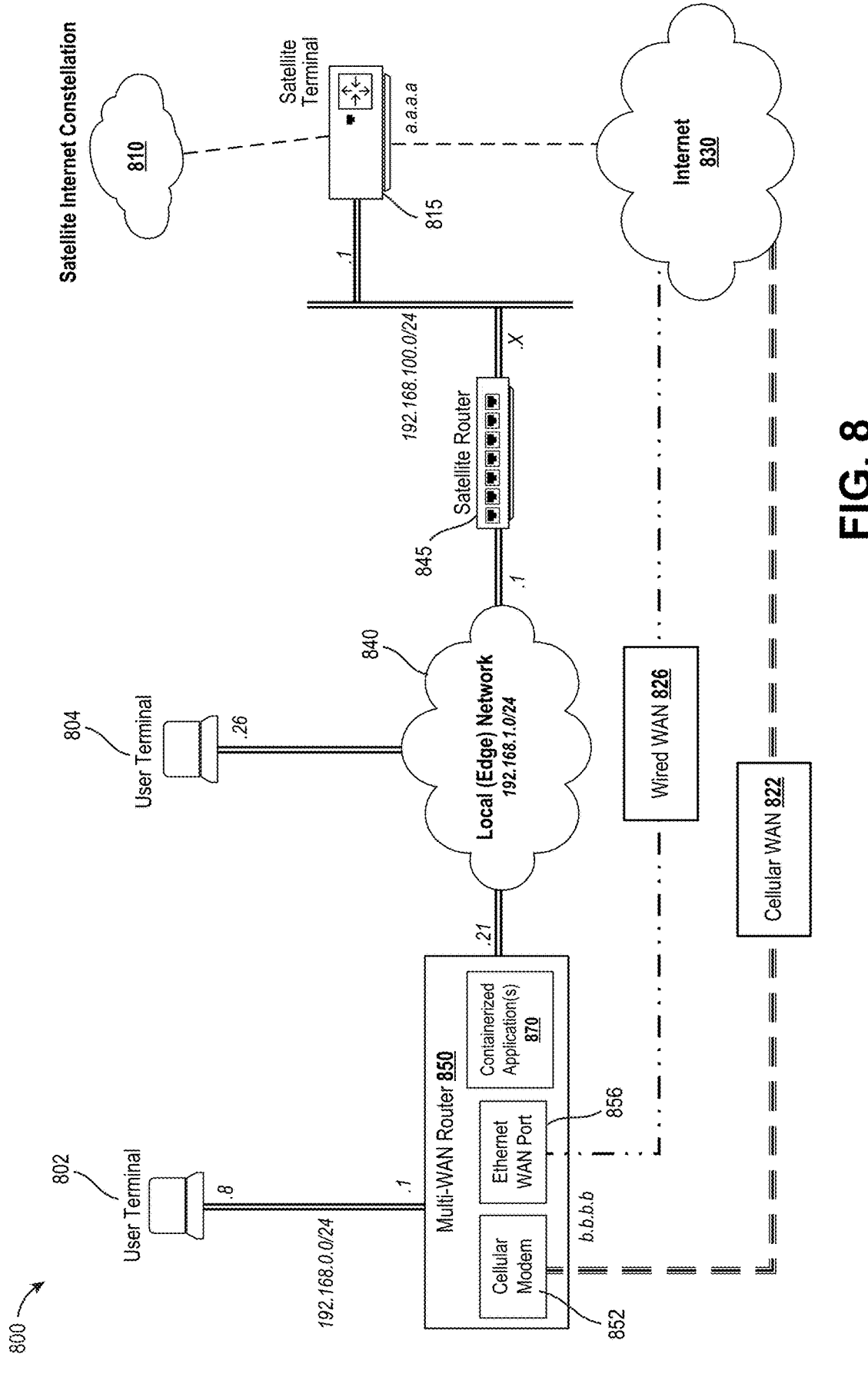
FIG. 8 is a diagram illustrating an example computing system architecture for multiple Wide Area Network (multi-WAN) routing and network management at the edge, in accordance with some examples.

For example, FIG. 8 is a diagram illustrating an example computing system architecture 800 for multiple Wide Area Network (multi-WAN) routing and network management at the edge, in accordance with some examples. An edge deployment site (e.g., an edge location) can include one or more user terminals (e.g., user devices, computing devices, edge, devices, UEs, edge assets, etc.) 802, 804, . . . , etc. For instance, the user terminals 802 and 804 of FIG. 8 may be the same as or similar to one or more of the UE 230 of FIGS. 2A and 2B; the edge data center apparatus 300a of FIG. 3A and/or 300b of FIG. 3B; the edge compute unit 430 and/or the edge assets 410 of FIG. 4; the edge compute units 704 of FIG. 7; the user device 795 of FIG. 7; the edge assets 710-1, . . . , 710-N of FIG. 7; etc.

The user terminals 802, 804 can be associated with a local network 840, which can be a local edge network provided at the same edge deployment site or location as the user terminals 802, 804. For instance, the local edge network 840 can be a local network provided by one or more edge compute units/edge data center apparatuses also located at the edge deployment site with the user terminals 802, 804. In some aspects, the local edge network 840 can be the same as or similar to the local network 420 of FIG. 4, associated with and created by the edge compute unit 430 of FIG. 4.

In some examples, the local edge network 840 can be associated with satellite internet connectivity. For instance, the local edge network 840 can be coupled to a satellite router 845 and a satellite user terminal 815 that are configured to provide communications and/or connectivity with a satellite internet constellation 810. In some embodiments, the satellite internet constellation 810 can be the same as or similar to one or more of the satellite internet constellations described with respect to FIGS. 2A and/or 2B.

The satellite internet constellation 810 may be used, in at least some cases, to provide a portion of the internet backhaul links between the local edge network 840 (and connected edge devices/user terminals 802, 804) and a remote network (e.g., the internet, an enterprise intranet or network, etc.). For instance, communications transmitted and/or received via satellite internet constellation 810 and the satellite user terminal 815/satellite router 845 can be associated with one or more links included in the set of internet backhaul links 440 shown in FIG. 4.

In some embodiments, the satellite user terminal 815 can be associated with managing, configuring, monitoring, etc., the connection and communications between the local edge network 840 and the satellite internet constellation 810. For instance, the satellite user terminal 815 can be associated with and/or used to implement at least a portion of the satellite edge connectivity management engine 680 described above with respect to FIG. 6. In some cases, the satellite user terminal 815 may additionally, or alternatively, be associated with and/or used to implement at least a portion of the connector services 677 of FIG. 6.

As used herein, satellite internet constellation 810 edge connectivity hardware can refer to the satellite user terminal 815, the satellite router 845, or both. The satellite internet constellation 810 edge connectivity hardware can be included in (e.g., deployed to the edge site by) an edge compute unit/edge data center apparatus, such as those shown in the examples of FIG. 3A, FIG. 3B, and/or FIG. 4. For example, the satellite internet constellation 810 edge connectivity hardware can be included in one or more networked communications modules of the edge datacenter apparatus, as described previously above. The satellite internet constellation 810 edge connectivity hardware may include one or more (or a plurality of) satellite transceivers (also referred to as satellite dishes) for implementing the physical transmission and reception of wireless communications to and from, respectively, various satellites of the satellite internet constellation 810.

In some embodiments, the satellite terminal 815 can be the same as (and/or may otherwise include) the satellite transceiver/satellite dish described previously in the examples made with respect to FIGS. 1-7. For instance, the satellite terminal 815 can itself directly provide bidirectional communications to the individual satellites (e.g., overhead or within range/line-of-sight of the edge deployment location of the edge network 840 and satellite terminal 815) of the satellite internet constellation 810. To implement a satellite transceiver/satellite dish for communications with the satellite internet constellation 810, the satellite terminal 815 can, for example, include a phased-array antenna that includes multiple antenna elements for establishing a two-way (bi-directional) communication link with satellites of the satellite internet constellation 810. In addition to the phased-array antenna, the satellite terminal 815 may include control circuitry or components for performing electronic beamforming to steer the antenna beam onto the overhead satellite(s) of the satellite internet constellation 810, to enable improved signal quality, automatic alignment with the overhead satellites 810, etc.

In some cases, the satellite terminal 815 can include the phased-array antenna and beamforming/alignment control module(s) for communications over the communication link shown in FIG. 8 between the satellite terminal 815 and the satellite internet constellation 810. The satellite terminal 815 can further include an integrated modem, which modulates the signals sent (e.g., from the local edge network 840) to the satellite internet constellation 810 and demodulates the signals received from the satellite internet constellation 810. For instance, when the satellite terminal 815 uses its phased-array antenna to receive a signal from the satellite internet constellation 810, the received signal is demodulated by the integrated modem of satellite terminal 815 in order to extract the digital data encoded thereon.

The satellite terminal 815 is associated with (e.g., communicatively coupled) with a corresponding satellite router 845 that is provided at the local edge deployment site. For instance, the satellite router 845 can be used to couple the digital data connectivity from the input/output of the integrated modem of the satellite terminal 815 to the local edge network 840. In other words, the satellite router 845 can be a connected device on the local edge network 840 that is configured to route data packets between the local edge network 840 and the wider internet (or other network(s)) reachable over the satellite internet constellation 810 connectivity. To communicate using the satellite internet constellation 810, the local devices (e.g., user terminals 802, 804, etc.) of the edge deployment site can communicate with the satellite router 845 over the local edge network 840.

The satellite router 845 forwards the data packets from the local devices to the integrated modem of the satellite terminal 815, which then modulates the data into a format suitable for transmission via the satellite uplink provided using the antenna or transceiver of the satellite terminal 815. To receive data from the satellite internet constellation 810 at the local edge deployment site shown in FIG. 8, the process is reversed. The integrated modem of the satellite terminal 815 demodulates the incoming signal received via the satellite downlink from the satellite internet constellation 810 to the antenna or transceiver of the satellite terminal 815. The data packets obtained from demodulating the satellite downlink signal are transmitted from the integrated modem of the satellite terminal 815 to the satellite router 845, and the satellite router 845 then routes the data packets to the appropriate local device(s) such as user terminals 802, 804 and/or other locations on or associated with the local edge network 840 of FIG. 8.

In some aspects, the satellite internet constellation 810 provides the satellite terminal 815 (and satellite router 845, and connected devices/network of the satellite router 845) with data network connectivity to the internet 830. It is noted that the internet 830 is depicted in the example of FIG. 8 as distinct from the satellite internet constellation 810 for clarity of illustration, and that the depicted link in FIG. 8 between the satellite terminal 815 and the internet 830 is a communication link provided via the satellite internet constellation 810.

As mentioned previously, the satellite uplink and downlink between satellite terminal 815 and the satellite internet constellation 810 (and therefore on to internet 830) can be used to provide one or more internet backhaul links to the local edge network 840 of FIG. 8 (e.g., the same as or similar to the internet backhaul link(s) 440 described with respect to FIG. 4). However, utilizing the satellite terminal 815 connectivity to satellite internet constellation 810 as the sole internet backhaul link for reaching the internet 830 can be associated with reduced reliability and/or periods of intermittent or unavailable internet backhaul connectivity for the local edge network 840. For instance, the use of satellite terminal 815 to provide internet backhaul connectivity to the local edge network 840 (via satellite router 845 on one end of the link, and satellite internet constellation 810 on the other end) can depend on the availability of communications between the antenna array of satellite terminal 815 and individual satellites of the satellite internet constellation 810.

During periods of satellite handover (e.g., which can occur as LEO satellites of the satellite internet constellation 810 move quickly across the sky/overhead the local edge deployment site), the dish of the satellite terminal 815 must switch its connection from one satellite to another. During such handovers, periods of service interruption may occur. Additionally, factors such as adverse weather conditions may cause unavailability of backhaul internet connectivity via satellite internet constellation 810. Heavy rain or snow can cause signal attenuation that reduces the quality of the connection between the satellite terminal 815 and the satellite internet constellation 810 (e.g., rain fade). Line of sight obstructions (e.g., from trees, buildings, other physical obstacles, etc.) that obstruct the direct line of sight between the dish of the satellite terminal 815 and a satellite of the constellation 810 can also degrade or interrupt the service. Other examples of service interruption or degradation associated with the satellite internet constellation 810 may include, but are not limited to, high network congestion (insufficient bandwidth available to the satellite terminal 815), solar interference, hardware failure, thermal issues, satellite anomalies, ground station issues, etc.

Accordingly, there is a need for failover or backup network availability to extend or augment internet backhaul connectivity provided by the satellite terminal 815 and satellite internet constellation 810. In one illustrative example, a multi-WAN router 850 can be provided and configured to implement additional network connectivity using various network modalities that are different from the satellite internet connectivity modality provided by the satellite terminal 815. For instance, in some embodiments the multi-WAN router 850 can be configured to provide connectivity (and automatic switching and/or traffic management therebetween) to two or more WANs of different communication modalities. As illustrated in the example of FIG. 8, the multi-WAN router 850 can provide backhaul connectivity to internet 830 via a first WAN/first WAN link associated with a wired WAN 826, and can provide backhaul connectivity to internet 830 via a second WAN/second WAN link associated with a cellular WAN 822.

In some aspects, the multi-WAN router 850 can be configured to connect the local edge network 840 and/or various devices attached to the local edge network 840 (e.g., user terminal 802, user terminal 804, etc.) to the internet 830, without utilizing connectivity from the satellite terminal 815 or satellite internet constellation 810. The multi-WAN router 850 can additionally be configured to connect the satellite router 845 and/or satellite terminal 815 itself to the internet 830 using one or both of the wired WAN 826 or cellular WAN 822, based on the satellite router 845 and satellite terminal 815 both being connected to or otherwise reachable by the local edge network 840 as well.

In some aspects, the multi-WAN router 850 can connect devices of the local edge network 840 to the internet 830 via both cellular connections (e.g., associated with cellular WAN 822) and wired connections such as Ethernet (e.g., associated with wired WAN 826). The multi-WAN router 850 can include one or more corresponding network interfaces for each WAN of the multiple WANs supported by the multi-WAN router 850. For instance, multi-WAN router 850 in the example of FIG. 8 can include one or more cellular WAN 822 interfaces and one or more wired WAN 826 interfaces. The multi-WAN router 850 can be configured to switch between the different WAN interfaces based on factors such as availability, load balancing, quality-of-service (QOS), failover settings or configurations, etc.

For example, the multi-WAN router 850 can include a cellular modem 852 and a cellular interface for connecting to cellular WAN 822 and providing wireless backhaul connectivity to the internet 830. The multi-WAN router 850 can include an Ethernet WAN port 856 (or other suitable wired WAN 826 interface connector) for providing wired backhaul connectivity to the internet 830 over the wired WAN 826.

In some embodiments, the multi-WAN router 850 can provide backup and/or failover backhaul internet links for any combination of the available internet backhaul links at the local edge deployment site of the local edge network 840. For instance, multi-WAN router 850 can automatically switch (failover) from using the Ethernet WAN port 856 and wired WAN 826 to provide backhaul to the internet 830, to instead using the cellular WAN 822 and cellular modem 852 for internet 830 backhaul, based on detecting or determining that the Ethernet port 856 connectivity has become unavailable or degraded in QoS below one or more configured threshold or triggers. The multi-WAN router 850 can automatically switch to using an attached or integrated cellular SIM card (e.g., cellular modem 852, etc.) to thereby use the cellular WAN 822 to provide wireless cellular backhaul connectivity between the local edge network 840 and the internet 830.

In one illustrative example, the multi-WAN router 850 can be communicatively coupled to the satellite terminal 815 via the satellite router 845. Accordingly, the multi-WAN router 850 can be configured to implement network switching and/or network management for the multiple WANs 822, 826 and the satellite internet constellation 810 network, in response to one or more detected conditions, parameters, scenarios, events, failures, etc., associated with the satellite internet constellation 810 and satellite terminal 815.

In another illustrative example, the multi-WAN router 850 can utilize its connectivity to the satellite terminal 815 to provide remote access and/or additional access to telemetry or configuration information that would otherwise only be available from the satellite terminal 815 directly. In other words, the multi-WAN router 850 can leverage its direct connection to the satellite terminal 815 (e.g., via satellite router 845 and local edge network 840) to access the interface(s) of the satellite terminal 815. In some aspects, the multi-WAN router 850 can be configured to expose the satellite terminal 815 data and/or interfaces to a remote user or remote computing device, including exposing the satellite terminal 815 data and/or interfaces to the platform software stack 502 and/or telemetry and monitoring observer 530 and/or the remote fleet management control plane 520 shown in FIG. 5; the platform services 602 and/or telemetry and monitoring observer 630 and/or satellite edge connectivity management engine 680 and/or global management console 620 of FIG. 6; and/or the global management console 620, remote fleet management control plane 520, edge host 705, edge OS 615, etc., shown in FIG. 7; etc.

Notably, in at least some embodiments, the multi-WAN router 850 can be configured to support, implement, or otherwise run one or more containerized applications 870 onboard the multi-WAN router 850 itself. For example, the multi-WAN router 850 can include the hardware resources to run one or more Docker containers or various other containerized applications thereon.

In some aspects, one or more of the containerized applications 870 running on the multi-WAN router 850 can be configured to provide communications to and from the interface of the satellite terminal 815. For example, the satellite terminal 815 may utilize a gRPC (Remote Procedure Call) interface, which is an API that allows for real-time communication between the satellite terminal 815 hardware and various client applications, for instance for purposes of monitoring and/or configuration, etc. gRPC can be implemented to utilize protocol buffers (protobufs) for efficient serialization of structured data. The gRPC interface of the satellite terminal 815 can, in some examples, be used to expose services of the satellite terminal 815 and/or associated with satellite internet constellation 810, that allow telemetry data or status information to be retrieved, that allow commands or configurations to be transmitted to the satellite terminal 815, etc.

In some embodiments, the multi-WAN router 850 can include one or more containerized applications 870 that are configured to communicate with or otherwise utilize the APIs exposed through the satellite terminal 815 interface (e.g., gRPC interface) to perform telemetry collection directly from the satellite terminal 815. Additionally, the same (or different) containerized application 870 running on the multi-WAN router 850 can be used to implement one or more management functionalities for any combination of the satellite terminal 815, the satellite router 845, and/or the multi-WAN router 850. For example, management functionalities performed by the containerized application 870 for the satellite terminal 815 and associated satellite internet constellation connectivity can include, but are not limited to, actions such as rebooting the satellite router 845 or satellite terminal 815, stowing and/or unstowing the dish or antenna array of the satellite terminal 815, performing various data collection actions from the satellite terminal 815, etc.

In another example, the same (or additional) containerized application 870 running on the multi-WAN router 850 and communicating with the API(s) exposed through the interface of the satellite terminal 815 can be configured and used to collect telemetry data associated with the satellite internet connectivity provided by the satellite terminal 815. For instance, a containerized application 870 running on the multi-WAN router 850 can collect telemetry data indicative of the uplink rate, downlink rate, throughput, latency, if there is a ping drop, the ping drop itself, the occurrence of an outage, the reason(s) or contributing causes of a satellite connectivity outage, etc.

For instance, satellite connectivity outages may occur due to various external factors that are remote from the satellite terminal 815 itself (e.g., adverse weather, solar events, etc., as described previously above). However, a second class of satellite connectivity outages may occur due to factors associated with the satellite terminal 815 itself, for instance such as when the satellite terminal 815 is performing an update, is triggered to reboot, etc. This telemetry data can be accessed by the containerized application(s) 870 on the multi-WAN router 850, and moreover, can be consumable through the multi-WAN router 850. In some embodiments, the multi-WAN router 850 is configured to automatically upload the satellite telemetry data obtained from satellite terminal 815 to one or more remote clouds or other remote devices/destinations. For instance, the multi-WAN router 850 can automatically upload satellite telemetry data to a management cloud, the same as or similar to a cloud associated with one or more of the platform software stack 502 of FIG. 5, the remote fleet management control plane 520 of FIG. 5, the platform services 602 of FIG. 6, the global management console 620 of FIG. 6, the global management platform 702 of FIG. 7, the global management console 620 of FIG. 7, etc.

In some aspects, the multi-WAN router 850 can be configured to run multiple containers (e.g., multiple containerized applications 870) simultaneously. For example, a first containerized application 870 can run on the multi-WAN router 850 in order to collect telemetry data of the satellite terminal 815 and/or satellite internet constellation 810 connectivity to the local edge network 840. In another illustrative example, a telemetry collection containerized application 870 can be used to provide telemetry data and/or at least some management functionalities in the event that the satellite terminal 815 APIs go down. For instance, the satellite terminal 815 APIs may be configured to run in the cloud (e.g., a cloud or private cloud associated with the operator of the satellite internet constellation 810), and can normally be contacted directly to obtain the telemetry data and perform some limited management functionality. However, periods of time may occur where the satellite APIs running in the cloud go down or otherwise become unavailable. Conventionally, an outage of the satellite APIs would result in the users of the satellite terminals 815 and the satellite internet constellation 810 being unaware of and unable to access data coming in, and/or information indicative of why satellite connectivity may be down or degraded.

Using the telemetry collection containerized application 870 and the multi-WAN router 850 presented in the systems and techniques described herein, outages of the satellite internet constellation 810 provider's API or cloud can be addressed via the local access provided to the satellite terminal 815 by the multi-WAN router 850 and telemetry collection containerized application 870 running thereupon. Based on the local access to the satellite terminal 815 that is provided by the multi-WAN router 850, the systems and techniques can advantageously be utilized to obtain debugging data from the satellite terminal 815, which may enable the issue and root cause to be identified and remediated.

In another illustrative example, one or more additional containerized applications 870 can run on the multi-WAN router 850 in order to provide management functionalities. For instance, if a reboot is required for the satellite terminal 815 and/or satellite router 845, a corresponding management signal or configuration can be sent to the management container 870 running on the multi-WAN router 850, which subsequently communicates with the satellite terminal 815 and causes the satellite terminal 815 and/or satellite router

845 to perform the commanded reboot. In another example, if multiple satellite terminals 815 are connected to the local edge network 840, a first satellite terminal can be disabled and all traffic pushed through the second satellite terminal, with the first satellite terminal enabled on an as-needed basis (e.g., for backup or failover, for additional bandwidth or throughput, etc.). For instance, if a user or other entity associated with the example system architecture 800 of FIG. 8 has a data plan on multiple satellite terminals 815 available at the same local edge site (e.g., the local edge site associated with local edge network 840), the management application container 870 on the multi-WAN router 850 can be configured to efficiently utilize data across the multiple plans and multiple satellite terminals 815 (e.g., switching the respective terminals of the multiple satellite terminals 815 on and off based on the current data consumption or data transmission needs, etc.).

The local compute associated with running the containerized applications 870 can be provided and managed directly by the multi-WAN router 850 itself. For instance, the containerized applications 870 can run on local compute hardware that is included in a single housing of the multi-WAN router 850, along with the cellular modem 852 and ethernet WAN port 856 also shown in FIG. 8. The multi-WAN router 850 can be configured with one or more containerized applications 870 that perform automatic failover from the satellite terminal 815 and/or backhaul internet links using satellite internet constellation 810, to backhaul internet links provided over one or more of the wired WAN 826 and/or the cellular WAN 822, etc.

Although FIG. 8 illustrates an example configuration where the multi-WAN router 850 communicates with the satellite terminal 815 through the satellite router 845, it is also contemplated herein that the multi-WAN router 850 can implement the presently disclosed features and functionalities based on direct communications/coupling between the multi-WAN router 850 and the satellite terminal 815 (e.g., without the satellite router 845 included in the communication path therebetween). In some embodiments, the multi-WAN router 850 can be used to implement the same (or similar) functionality as the satellite router 845. For instance, the system architecture 800 of FIG. 8 can be implemented without a standalone satellite router 845, based on configuring the multi-WAN router 850 to perform the functionalities of the satellite router 845 (e.g., for instance using one or more corresponding containerized applications 870 for performing the satellite router 845 functionalities) or otherwise configuring the multi-WAN router 850 to include or integrate the satellite router 845. In some aspects, the multi-WAN router 850 can be used to connect the local edge network 840 and any devices thereon (e.g., user terminal 802, 804, etc.) to any combination of the satellite terminal 815/satellite internet constellation 810, the cellular WAN 822, the wired WAN 826, etc., without the use of other or additional routing devices.

In some embodiments, the multi-WAN router 850 and/or one or more containerized applications 870 running thereon can be used to monitor network performance and/or to implement switching connections across the different network modalities (e.g., satellite internet constellation 810, wired WAN 826, cellular WAN 822, etc.). For example, network switching logic or rules can be implemented by multi-WAN router 850 to automatically switch between a 5G cellular connection (e.g., cellular WAN 822) or the satellite constellation 810 connection in order to meet a network latency target or to stay below one or more configured latency thresholds.

In general, it is contemplated that the multi-WAN router 850 can perform network performance monitoring and connection switching to enable and maintain various different QoS conditions or requirements for the local edge network 840 and connected devices (e.g., user terminals 802, 804, etc.). In one illustrative example, if a large amount of data needs to be transmitted from the local network 840 to the internet 830, the multi-WAN router 850 can automatically switch connectivity from using the satellite terminal 815 (e.g., based on the satellite internet constellation 810 connectivity having a relatively low data cap or threshold data transmit quantity) to instead utilizing 5G cellular WAN 822 and/or wired WAN 826, which may have a lower data cap (or no data cap at all) for therefore transmitting the large amount of data more economically and efficiently.

In some embodiments, the multi-WAN router 850 can maintain and switch network connectivity to provide different QoS to different groups or subsets of devices on the local edge network 840. For instance, the multi-WAN router 850 can be configured to provide connectivity to multiple VLANs, where a first VLAN is used for managing critical devices, such as POS devices, devices running emergency applications, etc., and the remaining VLANs are used for managing less critical devices and services that can use a lower or different QoS than the first VLAN. In such an example, the multi-WAN router 850 can automatically provide a greater priority to communications to and/or from the first VLAN that is used to manage critical devices, based on using QoS rules implemented within the multi-WAN router 850 to perform the corresponding or appropriate traffic prioritization between the internet 830 and the first VLAN of critical devices on local edge network 840.

In another example, the multi-WAN router 850 and/or containerized applications 870 can implement one or more security services, such as malware protection, access restriction for certain websites, etc. Various security configurations for communications across the satellite internet constellation 810, wired WAN 826, cellular WAN 822, and/or any WAN connected via the multi-WAN router 850 can be implemented using the systems and techniques described herein.

In another illustrative example, the multi-WAN router 850 can be used to implement load balancing across the satellite internet constellation 810, wired WAN 826, cellular WAN 822, and/or any WAN connected via the multi-WAN router 850, based on distributing network traffic across multiple ones of the different available backhaul connections/connection modalities between the local edge network 840 and the internet 830.

In some embodiments, the containerized applications 870 running on the multi-WAN router 850 can include one or more machine learning models that are trained offline. For instance, offline machine learning can be implemented with respect to the performance of the satellite internet constellation 810 connectivity over time, and the resulting trained ML model can be deployed as a containerized application 870 to predictively manage network switching based on observed patterns of behavior of the satellite internet constellation 810 connectivity during training. For instance, the trained ML model may observe that the satellite internet constellation 810 connectivity has repeatedly degraded or become unavailable at a certain time (e.g., Wednesdays between 5 pm to 7 pm; etc.) Accordingly, the trained ML model can be implemented on the multi-WAN router 850 to automatically switch connectivity between the multi-WAN router 850 and the internet 830 to either a wired WAN 826 backhaul link and/or a cellular WAN 822 backhaul link before the outage even occurs for the satellite internet constellation 810 (e.g., continuing in the example above, connectivity may switch ahead of the predicted failure by activating wired WAN 826 backhaul or cellular WAN 822 backhaul at 4:59 pm until 7:01 pm; etc.).

In some embodiments, the multi-WAN router 850 and containerized applications 870 can be used to implement a configurable SDN layer for the local edge network 840 that performs functions such as priority traffic steering, QOS, automatic communication link or modality switching, automatic failover between the different available connections (e.g., between satellite internet constellation 810, wired WAN 826, wireless/cellular/5G WAN 822, etc.), etc. In some aspects, the multi-WAN router 850 can include one or more containerized applications 870 for implementing the SDN layer, where the SDN containerized application(s) 870 are the same as or similar to (or otherwise included in or used to implement) the SDN network configuration service 660 of FIG. 6 and/or the SDN network provisioning and management service 665 also of FIG. 6.

In some examples, the systems and techniques described herein can be implemented or otherwise performed by a computing device, apparatus, or system. In one example, the systems and techniques described herein can be implemented or performed by a computing device or system having the computing device architecture 900 of FIG. 9. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Processes described herein can comprise a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
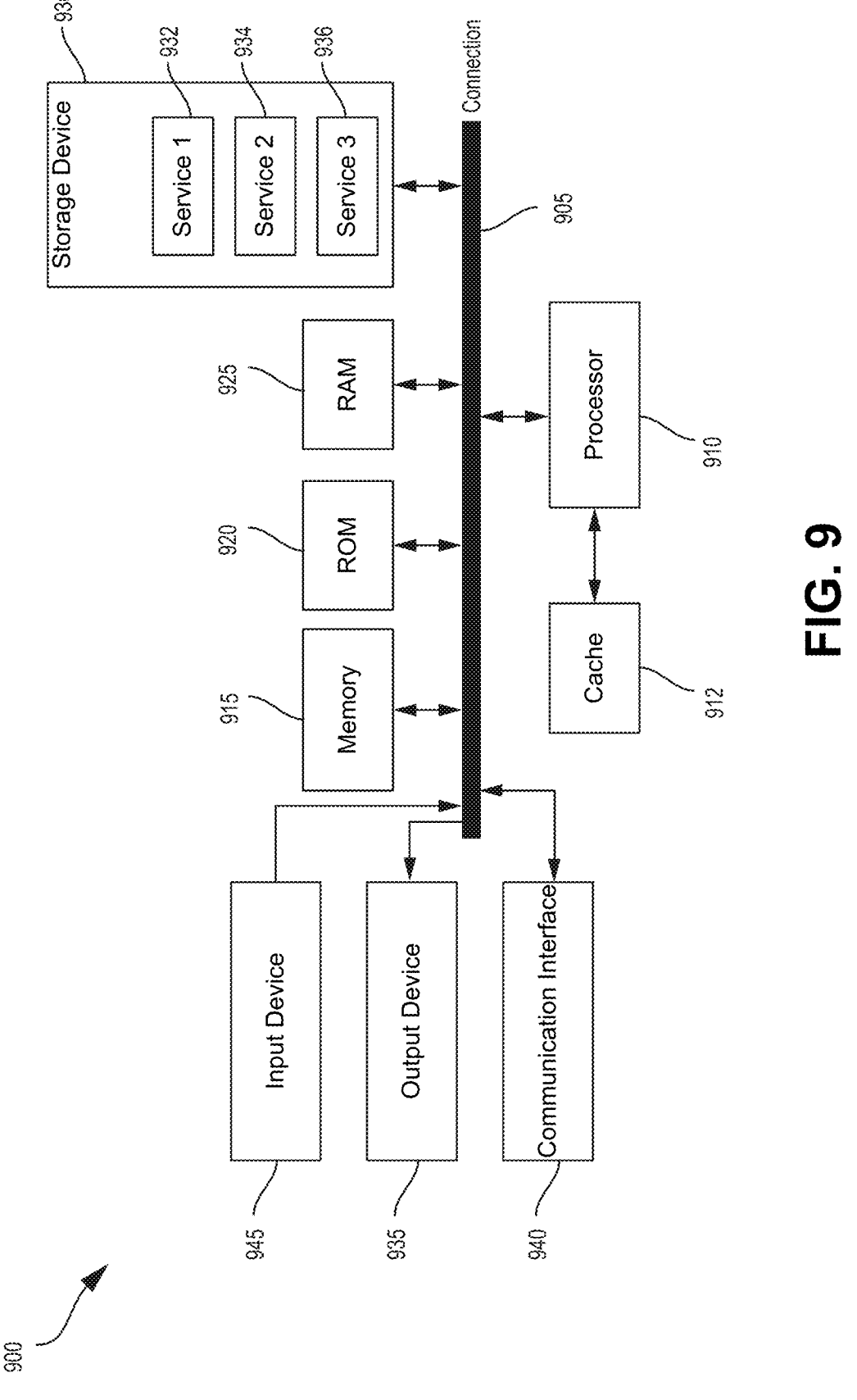
FIG. 9 is a block diagram illustrating an example of a computing system architecture that can be used to implement one or more aspects described herein, bin accordance with some examples.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random-access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other engines can control or be configured to control processor 910 to perform various actions. Other computing device memory 915 may be available for use as well. Memory 915 can include multiple different types of memory with different performance characteristics. Processor 910 can include any general-purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules or engines are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one of" a set and/or "one or more" of a set indicates that one member of the set or multiple members of the set (in any combination) satisfy the claim. For example, claim language reciting "at least one of A and B" or "at least one of A or B"

means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for network management, the method comprising: configuring a first backhaul connection between a local edge network and a remote wide area network (WAN), the first backhaul connection implemented using a first communication modality of a plurality of communication modalities of a multiple-WAN (multi-WAN) network device included in the local edge network; configuring a second backhaul connection between the local edge network and the remote WAN, the second backhaul connection implemented using a second communication modality of the plurality of communication modalities of the multi-WAN network device, wherein the second communication modality is different from the first communication modality; obtaining, using a first containerized application running on the multi-WAN network device, one or more of telemetry information or monitoring information generated by a satellite internet constellation terminal included in the local edge network, wherein the telemetry information or monitoring information is obtained from the satellite internet constellation terminal over the local edge network; transmitting at least a portion of the telemetry information or monitoring information to a cloud management entity associated with the local edge network, wherein the at least a portion of the telemetry information or monitoring information is transmitted using one or more of the first backhaul connection or the second backhaul connection implemented by the multi-WAN network device; and implementing, by the multi-WAN network device, a network configuration adjustment for one or more of the first or second backhaul connection, the network configuration adjustment based at least in part on the telemetry information or monitoring information.

Aspect 2. The method of Aspect 1, further comprising: receiving, from the cloud management entity, information indicative of one or more management commands based on the at least a portion of the telemetry information or monitoring information; and implementing the network configuration adjustment based on the one or more management commands.

Aspect 3. The method of any of Aspects 1 to 2, wherein the network configuration adjustment is implemented using a second containerized application running on the multi-WAN network device.

Aspect 4. The method of Aspect 3, wherein the network configuration adjustment is implemented for a satellite backhaul connection between the satellite internet constellation terminal and the remote WAN.

Aspect 5. The method of Aspect 4, wherein the second containerized application is configured to: receive a management command from the cloud management entity in response to the transmission of the at least a portion of the telemetry information or monitoring information from the multi-WAN network device to the cloud management entity, the management command associated with the satellite internet constellation terminal; and transmit the management command to a local interface of the satellite internet constellation terminal to cause the satellite internet constellation terminal to perform an action corresponding to the management command.

Aspect 6. The method of Aspect 5, wherein the second containerized application transmits the management command over the local edge network to the local interface of the satellite internet constellation terminal.

Aspect 7. The method of any of Aspects 5 to 6, wherein the second containerized application transmits the management command over a direct connection between the multi-WAN network device and the local interface of the satellite internet constellation terminal, wherein the direct connection is not associated with the local edge network.

Aspect 8. The method of any of Aspects 5 to 7, wherein the action corresponding to the management command comprises one or more of: a reboot of the satellite internet constellation terminal, a reboot of a satellite internet router included in the local edge network and connected to the satellite internet constellation terminal, stowing a dish or antenna array of the satellite internet constellation terminal, or unstowing a dish or antenna array of the satellite internet constellation terminal.

Aspect 9. The method of any of Aspects 1 to 8, wherein the first containerized application is included in a plurality of containerized applications running on the multi-WAN network device, and wherein the plurality of containerized applications are configured to communicate with the satellite internet constellation terminal over the local edge network using one or more application programming interfaces (APIs) associated with the satellite internet constellation terminal.

Aspect 10. The method of any of Aspects 1 to 9, wherein the first containerized application is included in a plurality of containerized applications running on the multi-WAN network device, and wherein the plurality of containerized applications are configured to communicate with the satellite internet constellation terminal using one or more of a remote procedure call (RPC) interface of the satellite internet constellation terminal or a protocol buffer associated with the satellite internet constellation terminal.

Aspect 11. The method of any of Aspects 1 to 10, wherein the first containerized application is configured to obtain the telemetry information from a local interface of the satellite internet constellation terminal, the telemetry information including respective values for one or more parameters or measurements corresponding to satellite internet backhaul connectivity provided from the local edge network to a satellite internet constellation.

Aspect 12. The method of Aspect 11, wherein the one or more parameter or measurements comprise one or more of: uplink rate, downlink rate, throughput, latency, ping drop, outage information, or outage cause information.

Aspect 13. The method of any of Aspects 1 to 12, wherein the first containerized application is configured to obtain the monitoring information from a local interface of the satellite internet constellation terminal, the monitoring information indicative of a status or one or more measured values associated with one or more hardware components included in the satellite internet constellation terminal.

Aspect 14. The method of any of Aspects 1 to 13, wherein the monitoring information includes debugging data from the satellite internet constellation terminal, and wherein the network configuration adjustment is based at least in part on the debugging data.

Aspect 15. The method of any of Aspects 1 to 14, wherein the multi-WAN network device comprises a multi-WAN router network device deployed on the local edge network.

Aspect 16. The method of any of Aspects 1 to 15, wherein the first communication modality of the multi-WAN network device comprises a wired communication modality, and wherein the first backhaul connection comprises a wired internet backhaul connection from the local edge network.

Aspect 17. The method of any of Aspects 1 to 16, wherein the second communication modality of the multi-WAN network devices comprises a wireless communication modality, and wherein the second backhaul connection comprises a wireless internet backhaul connection from the local edge network.

Aspect 18. The method of any of Aspects 1 to 17, wherein the second backhaul connection comprises a cellular internet backhaul connection from the local edge network, and wherein configuring the second backhaul connection comprises configuring a cellular modem included in the multi-WAN network device.

Aspect 19. The method of any of Aspects 1 to 18, wherein: the satellite internet constellation terminal is configured to provide one or more satellite backhaul connections between the local edge network and the remote WAN without using a communication modality of the plurality of communication modalities of the multi-WAN network device; and the multi-WAN network device is configured to transmit the at least a portion of the telemetry information or monitoring information to the cloud management entity without using one or more of: the satellite internet constellation terminal or one or more satellite internet constellation links.

Aspect 20. The method of any of Aspects 1 to 19, wherein the cloud management entity is a remote cloud management entity associated with a plurality of edge devices included in the local edge network, the plurality of edge devices including the multi-WAN network device and the satellite internet constellation terminal.

What is claimed is:

1. A method for network management, the method comprising:

configuring a first backhaul connection between a local edge network and a remote wide area network (WAN), the first backhaul connection implemented using a first communication modality of a plurality of communication modalities of a multiple-WAN (multi-WAN) network device included in the local edge network;

configuring a second backhaul connection between the local edge network and the remote WAN, the second backhaul connection implemented using a second communication modality of the plurality of communication modalities of the multi-WAN network device, wherein the second communication modality is different from the first communication modality;

obtaining, using a first containerized application running on the multi-WAN network device, one or more of telemetry information or monitoring information generated by a satellite internet constellation terminal included in the local edge network, wherein the telemetry information or monitoring information is obtained from the satellite internet constellation terminal over the local edge network;

transmitting at least a portion of the telemetry information or monitoring information to a cloud management entity associated with the local edge network, wherein the at least a portion of the telemetry information or monitoring information is transmitted using one or more of the first backhaul connection or the second backhaul connection implemented by the multi-WAN network device; and implementing, by the multi-WAN network device, a network configuration adjustment for one or more of the first or second backhaul connection, the network configuration adjustment based at least in part on the telemetry information or monitoring information.

2. The method of claim 1, further comprising:

receiving, from the cloud management entity, information indicative of one or more management commands based on the at least a portion of the telemetry information or monitoring information; and implementing the network configuration adjustment based on the one or more management commands.

3. The method of claim 1, wherein the network configuration adjustment is implemented using a second containerized application running on the multi-WAN network device.

4. The method of claim 3, wherein the network configuration adjustment is implemented for a satellite backhaul connection between the satellite internet constellation terminal and the remote WAN.

5. The method of claim 4, wherein the second containerized application is configured to:

receive a management command from the cloud management entity in response to the transmission of the at least a portion of the telemetry information or monitoring information from the multi-WAN network device to the cloud management entity, the management command associated with the satellite internet constellation terminal; and transmit the management command to a local interface of the satellite internet constellation terminal to cause the satellite internet constellation terminal to perform an action corresponding to the management command.

6. The method of claim 5, wherein the second containerized application transmits the management command over the local edge network to the local interface of the satellite internet constellation terminal.

7. The method of claim 5, wherein the second containerized application transmits the management command over a direct connection between the multi-WAN network device and the local interface of the satellite internet constellation terminal, wherein the direct connection is not associated with the local edge network.

8. The method of claim 5, wherein the action corresponding to the management command comprises one or more of: a reboot of the satellite internet constellation terminal, a reboot of a satellite internet router included in the local edge network and connected to the satellite internet constellation terminal, stowing a dish or antenna array of the satellite internet constellation terminal, or unstowing a dish or antenna array of the satellite internet constellation terminal.

9. The method of claim 1, wherein the first containerized application is included in a plurality of containerized applications running on the multi-WAN network device, and wherein the plurality of containerized applications are configured to communicate with the satellite internet constellation terminal over the local edge network using one or more application programming interfaces (APIs) associated with the satellite internet constellation terminal.

10. The method of claim 1, wherein the first containerized application is included in a plurality of containerized applications running on the multi-WAN network device, and wherein the plurality of containerized applications are configured to communicate with the satellite internet constellation terminal using one or more of a remote procedure call (RPC) interface of the satellite internet constellation terminal or a protocol buffer associated with the satellite internet constellation terminal.

11. The method of claim 1, wherein the first containerized application is configured to obtain the telemetry information from a local interface of the satellite internet constellation terminal, the telemetry information including respective values for one or more parameters or measurements corresponding to satellite internet backhaul connectivity provided from the local edge network to a satellite internet constellation.

12. The method of claim 11, wherein the one or more parameter or measurements comprise one or more of: uplink rate, downlink rate, throughput, latency, ping drop, outage information, or outage cause information.

13. The method of claim 1, wherein the first containerized application is configured to obtain the monitoring information from a local interface of the satellite internet constellation terminal, the monitoring information indicative of a status or one or more measured values associated with one or more hardware components included in the satellite internet constellation terminal.

14. The method of claim 1, wherein the monitoring information includes debugging data from the satellite internet constellation terminal, and wherein the network configuration adjustment is based at least in part on the debugging data.

15. The method of claim 1, wherein the multi-WAN network device comprises a multi-WAN router network device deployed on the local edge network.

16. The method of claim 1, wherein the first communication modality of the multi-WAN network device comprises a wired communication modality, and wherein the first backhaul connection comprises a wired internet backhaul connection from the local edge network.

17. The method of claim 1, wherein the second communication modality of the multi-WAN network devices comprises a wireless communication modality, and wherein the second backhaul connection comprises a wireless internet backhaul connection from the local edge network.

18. The method of claim 1, wherein the second backhaul connection comprises a cellular internet backhaul connection from the local edge network, and wherein configuring the second backhaul connection comprises configuring a cellular modem included in the multi-WAN network device.

19. The method of claim 1, wherein:

the satellite internet constellation terminal is configured to provide one or more satellite backhaul connections between the local edge network and the remote WAN without using a communication modality of the plurality of communication modalities of the multi-WAN network device; and the multi-WAN network device is configured to transmit the at least a portion of the telemetry information or monitoring information to the cloud management entity without using one or more of: the satellite internet constellation terminal or one or more satellite internet constellation links.

20. The method of claim 1, wherein the cloud management entity is a remote cloud management entity associated with a plurality of edge devices included in the local edge network, the plurality of edge devices including the multi-WAN network device and the satellite internet constellation terminal.

* * * * *